(12) United States Patent
Makuch et al.

(10) Patent No.: US 9,937,415 B1
(45) Date of Patent: Apr. 10, 2018

(54) VIRTUAL CONTROLLER FOR TOUCHSCREEN

(71) Applicant: AMAZON TECHNOLOGIES, INC., Reno, NV (US)

(72) Inventors: Jason David Makuch, Seattle, WA (US); Pavan Kumar Surishetty, Seattle, WA (US); Kimberly Nicole Hunter, Seattle, WA (US); Xin Wang, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 581 days.

(21) Appl. No.: 14/108,654

(22) Filed: Dec. 17, 2013

(51) Int. Cl.
| | | |
|---|---|---|
| A63F 9/24 | (2006.01) | |
| A63F 13/20 | (2014.01) | |
| G06F 3/0338 | (2013.01) | |
| G06F 3/038 | (2013.01) | |
| G06F 3/041 | (2006.01) | |
| A63F 13/42 | (2014.01) | |
| A63F 13/77 | (2014.01) | |
| A63F 13/22 | (2014.01) | |

(52) U.S. Cl.
CPC ............. *A63F 13/06* (2013.01); *A63F 13/22* (2014.09); *A63F 13/42* (2014.09); *A63F 13/77* (2014.09); *G06F 3/038* (2013.01); *G06F 3/0338* (2013.01); *G06F 3/0416* (2013.01)

(58) Field of Classification Search
CPC ...... A63F 13/2145; A63F 13/22; A63F 13/42; A63F 13/77
See application file for complete search history.

(56) References Cited

U.S. PATENT DOCUMENTS

| | | | |
|---|---|---|---|
| 6,727,884 B1 | 4/2004 | Leatham et al. | |
| 2009/0075687 A1 | 3/2009 | Hino et al. | |
| 2009/0305789 A1* | 12/2009 | Patil | A63F 13/06 463/42 |
| 2011/0009195 A1* | 1/2011 | Porwal | A63F 13/06 463/37 |
| 2011/0021271 A1 | 1/2011 | Ikeda et al. | |
| 2011/0276879 A1* | 11/2011 | Ando | A63F 13/10 715/702 |
| 2011/0285636 A1* | 11/2011 | Howard | G06F 3/04815 345/173 |

(Continued)

FOREIGN PATENT DOCUMENTS

WO    WO2013030800 A2    3/2013

OTHER PUBLICATIONS

Galka, Lawrence Stefan, "Non-Final Office Action dated Jun. 29, 2016", U.S. Appl. No. 14/108,748, The United States Patent and Trademark Office, Jun. 29, 2016.

(Continued)

*Primary Examiner* — Lawrence Galka
(74) *Attorney, Agent, or Firm* — Lindauer Law, PLLC

(57) ABSTRACT

Described are techniques and systems for providing a virtual controller user interface. The virtual controller user interface of a source media device accepts user input and provides control data based on that input to a target media device. The target media device may process the control data, injecting input events into an operating system of the target media device. An application executing on the target media device may use these inputs.

20 Claims, 14 Drawing Sheets

(56) References Cited

U.S. PATENT DOCUMENTS

| | | | |
|---|---|---|---|
| 2011/0314093 A1* | 12/2011 | Sheu | G06F 9/4445 |
| | | | 709/203 |
| 2012/0295712 A1 | 11/2012 | Nonaka | |
| 2013/0130800 A1* | 5/2013 | Sirilux | A63F 13/06 |
| | | | 463/37 |
| 2013/0205206 A1* | 8/2013 | Hawver | G06F 9/485 |
| | | | 715/704 |
| 2013/0217498 A1* | 8/2013 | Wang | A63F 13/42 |
| | | | 463/37 |
| 2013/0252741 A1 | 9/2013 | Ikenaga et al. | |
| 2013/0324242 A1* | 12/2013 | Vincent | A63F 13/06 |
| | | | 463/31 |
| 2013/0324244 A1 | 12/2013 | Mikhailov et al. | |
| 2014/0011584 A1* | 1/2014 | Shin | A63F 13/06 |
| | | | 463/31 |
| 2014/0295943 A1* | 10/2014 | Shono | A63F 13/795 |
| | | | 463/25 |
| 2014/0342818 A1 | 11/2014 | Smith et al. | |

OTHER PUBLICATIONS

Galka, Lawrence Stefan, "Final Office Action dated Jan. 3, 2017", U.S. Appl. No. 14/108,748, The United States Patent and Trademark Office, Jan. 3, 2017.

Galka, Lawrence Stefan, "Non-final Office Action dated Apr. 26, 2017", U.S. Appl. No. 14/108,748, The United States Patent and Trademark Office, Apr. 26, 2017.

\* cited by examiner

VIRTUAL CONTROLLER FOR TOUCHSCREEN

BACKGROUND

A media device may execute content such as games or other applications which accept user input. Traditionally these applications have accepted user input from dedicated controllers. For example, a game console media device may have a dedicated handheld controller.

Figure 1:
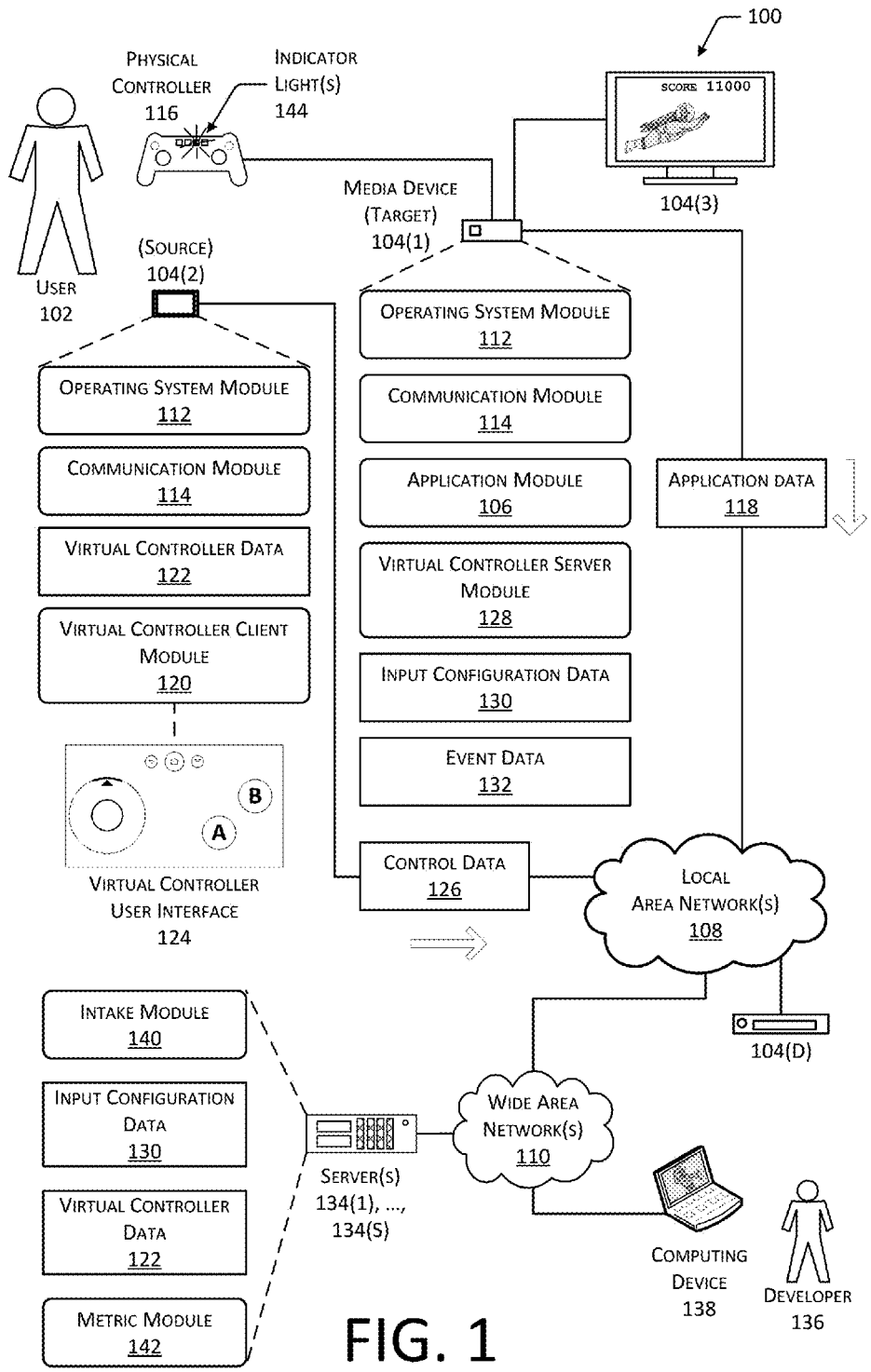
FIG. 1 is a system for a target media device to receive input from a virtual controller on a source media device.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Content such as video, music, applications including games, and so forth may be consumed using a variety of media devices. These media devices may include remote controls, televisions, set-top boxes, tablet computers, laptop computers, smartphones, desktop computers, media players, and so forth. The media devices may be configured to communicate with one another or other devices using one or more networks.

A media device such as a set-top box, game console, and so forth may execute an application, such as a game. The application typically accepts input from one or more users. The application may be intended for use on a particular form factor of device, or with a particular type of physical controller device. For example, the application may be designed for execution on a tablet computer and may be configured to accept touch input from a touch sensor. In another example, the application may be configured to accept input from a dedicated handheld game controller.

Traditionally use of these applications has been limited to the particular form factor of device, physical controller, or both. Described in this disclosure are systems and techniques to accept user input from a source media device and deliver control data based on that user input to a target media device. The user input comprises data or signals generated by the actions of the user, such as pressing a button, touching a touchscreen, moving a hand in a gesture which is detected by a camera, and so forth. The target media device may process the control data to generate event data, which may be injected into an operating system of the target media device. Injection may include writing or storing the event data to a file or memory location associated with input, which is read by the operating system. The event data is indistinguishable from inputs made locally to the target media device, and are processed as such. As a result, the application accepts the inputs from the source media device as if input locally to the target media device.

The source media device may provide a virtual controller user interface. The virtual controller user interface may present one or more user interface elements by way of the source media device. The user interface elements may include graphical output, haptic output, audible output, and so forth. In one implementation the source media device may comprise a tablet, smartphone, or other device having a display device and touch sensor. The display device may provide pictures of one or more virtual controls, while the touch sensor generates user inputs associated with those virtual controls. For example, the display device and touch sensor may be combined in a touchscreen, and a virtual controller comprising one or more virtual controls may be presented.

The virtual controls may include virtual joysticks, virtual action buttons, and so forth. In some implementations, the virtual controls are configured to simulate controls available on a physical controller. As the user moves a finger along the touchscreen proximate to the joystick virtual control, user inputs corresponding to those touches and motions are generated. Similarly, user inputs corresponding to touches on the action button virtual controls may be generated. In some implementations predictive or adaptive techniques may be applied to provide the correspondence between a particular touch or motion and a particular virtual control.

The target media device may provide application data to the source media device. The application data may include information indicative of the application executing on the target media device. For example, the target media device may provide information to the source media device that the game application "Whimsical Penguins" is executing, or about to be executed. The source media device may receive this application data and provide a virtual controller user interface on the source media device having virtual controls associated with inputs for the game.

The target media device may also manage the use of multiple controllers, both physical and virtual. This may include generating and maintaining player data which associates player numbers with controller identifiers indicative of participating controllers. The target media device may use the player number to determine which player in a game the control data from a particular controller is to be used for. For example, a first controller with a first controller identifier may direct a first character in the game while a second controller with a second controller identifier directs a second character in the game. Users may access a management user interface to add a controller, remove a controller, reassign player numbers to different controllers, and so forth. During gameplay, execution of the game may be suspended and the management user interface may be accessed to change the player data. Once the user has completed the desired changes, the management user interface may be closed, and gameplay may resume using the now modified player data. By using this interface, the user may thus change from one controller to another in the same game, while still controlling the same character.

The process of exchanging the application data and presenting the virtual controller user interface may occur automatically and without user intervention. For example, launching the game "Whimsical Penguins" on a set-top box media device may result in presentation of the virtual controller user interface for that game on tablets designated to act as game controllers.

Establishment of communication between the media devices may occur automatically. In some implementations configuration of communication transport mechanisms, distribution of application data, control data, and so forth may be performed free from user input. For example, a media device which is able to provide a virtual controller user interface and operate as a source may be automatically connected to the media device acting as a target when in communication range. The communication may include authentication, encryption, and so forth. In some implementations two or more media devices may be associated with one another based on one or more criteria. These criteria may include physical proximity, association with a common user account, geographic location, and so forth.

Applications may be processed to determine application inputs, such as particular physical buttons or keys used for input, soft or virtual buttons presented on screen for touch-enabled applications, mouse input, pointer input, joystick input, and so forth. The application inputs may be used to generate input mapping data which associates a particular application input with a particular user input. For example, the application input for "Button A" on a physical game controller device may be associated with a touch input at coordinates (935, 10) on a touch sensor. The input mapping data is used to generate event data which may include particular commands or expressions which are processed by the operating system as an input. In some implementations the input mapping data may be modified to allow remapping or changing one application input to different event data. For example, the application input for "Button D" may be remapped such that user input corresponding to "Button D" results in event data associated with activation of "Button C". This allows the user or another process to dynamically remap the virtual controls.

One or more virtual controller user interface arrangements may be associated with a particular application. For example, the application inputs may accept input from a joystick and input from two action buttons. The virtual controller user interface may present a first virtual controller user interface having a virtual joystick and two virtual action buttons, a second virtual controller user interface having a virtual joystick and more than two virtual actions buttons, and so forth. In some implementations the user may select or set a preferred virtual controller user interface. As with a dedicated controller activation of unused buttons may result in no activity. Alternatively, otherwise unused buttons may be mapped to provide other input functions.

The system and techniques described in this disclosure allow applications, including games, to be used on devices having form factors, user input devices, and so forth which differ from those originally or primarily intended or designed for at the time of application deployment. For example, a game designed to be played on a tablet computer may be executed on a target media device such as a set-top box receiving user input from the source media device providing a virtual controller user interface. Furthermore, users may use existing media devices to provide the virtual controller user interface to interact with applications instead of dedicated or specialized input devices such as dedicated game controllers. As a result users may consume additional content which would otherwise be inaccessible or unusable due to a lack of an input device, expanding the content available for consumption.

Illustrative System

FIG. 1 is a system 100 for a target media device to receive input from a virtual controller on a source media device. One or more users 102(1), 102(2), . . . , 102(Y) may use one or more media devices 104(1), 104(2), . . . , 104(D). As used in this disclosure, letters in parenthesis such as "(D)" indicate an integer value. The media devices 104 may include televisions, tablet computers, personal computers, electronic book readers, gaming consoles, set-top boxes, media players, in-vehicle entertainment systems, portable media players, smartphones, servers, and so forth. A group of media devices 104 may be affiliated with one another. This affiliation may be based on one or more of a common account, connection to a common network, connection to a common device, geographic location, and so forth. For example, a group of media devices 104 may comprise those media devices 104 which are in a particular home, or which are associated with a single account.

Content may be consumed, processed, distributed, and so forth by the media devices 104. The content may include audio files, video files, electronic book ("eBook") files, and so forth. The content may also include application modules 106 ("applications") such as games, word processors, and so forth. The content may be downloaded or streamed from a content provider for consumption, processing, storage, and so forth on the media device 104. The application modules 106 may be stored on one or more of the media devices 104.

The media devices 104 may couple to one or more local area networks (LANs) 108. The local area networks 108 may be personal area networks ("PANs"). The local area network(s) 108 may interconnect with one another facilitating communication between the media devices 104. The local area networks 108 may be supported using an access point topology, ad-hoc peer-to-peer topology, and so forth. The local area networks 108 may be wired, wireless, or a combination. The local area networks 108 may be implemented using Ethernet, Wi-Fi, Bluetooth, Bluetooth Low Energy, ZigBee, and so forth. Within the system 100, several different local area networks 108 may coexist. For example, media devices 104(1) and 104(6) may be connected to one another using Wi-Fi, while the media device 104(2) and 104(5) may be interconnected using Bluetooth.

The system 100 may also include one or more wide area networks (WANs) 110. The wide area networks 110 may be communicatively coupled with one or more of the media devices 104, the local area network(s) 108, and so forth. The wide area network 110 may include private networks, public networks such as the Internet, or a combination thereof. Connections may be established between media devices 104 which are on the same or different LANs 108 or WANs 110.

The media devices 104 may execute at least one operating system (OS) module 112. The OS module 112 is configured to accept input from input devices and provide the input to the application modules 106 or other modules executing on one or more processors, provide other services to the application modules 106, and so forth.

A communication module 114 may also execute on the media devices 104. The communication module 114 may be configured to participate in discovery of other media devices 104 and services they support or provide, exchange information, and so forth. The communication module 114 may provide a framework for establishing and using connections with the other media devices 104. The connections may be authenticated, encrypted, and so forth. The communication module 114 may include one or more transport modules. The transport modules are configured to provide functionality at a transport layer and establish and maintain communication channels that transfer bits from one media device 104 to another device. The communication module 114 may have multiple transport modules available contemporaneously.

In some implementations the system 100 may include a physical controller 116 which has one or more physical input controls or input devices. These controls may comprise joysticks, buttons, and so forth. The physical controller 116 comprises a device which is physically separate from the media device 104, such as having a separate case or enclosure. The physical controller 116 may communicate information indicative of user input wired or wirelessly to the media device 104. The physical controller 116 may comprise a mouse, pointer, gamepad, and so forth. For example, the media device 104 may comprise a game console and the physical controller(s) 116 may comprise the controls corresponding to the game console. In some implementations the physical controller 116 may be configured for use with a particular media device 104. For example, the physical control for one brand of game console may be inoperable with a different brand of game console. The physical controller(s) 116 may have one or more indicators lights 144. The indicator lights 144 may comprise one or more of light emitting diodes, quantum dot devices, incandescent bulbs, and so forth. In some implementations, these indicator lights 144 may be used to indicate the physical controller 116 is active, may indicate a player number, or may provide information associated with gameplay. For example, in some implementations the indicator lights 144 may be configured to present a number of lives remaining within a game which the physical controller 116 is being used to control.

The media devices 104 may act as "targets" or "sources" for user input. A "source" is a media device 104 which receives user input from the user 102. A "target" is a media device 104 which receives information from the "source" media device 104 and provides that information to the application 106 executing on the target media device 104. A media device 104 may transition between various roles, being a "source" in some situations and a "target" in others. In some implementations a media device 104 may act as a "source" for a first application 106 while contemporaneously acting as a "target" for a second application 106.

In FIG. 1, the target media device 104(1) is depicted as a set-top box or other device coupled to a television media device 104(3). The target media device 104(1) is executing, at least in part, the application module 106, illustrated as the game "Whimsical Penguin". Output associated with the game is presented by the television media device 104(3). The target media device 104(1) may use the communication module 114 to send application data 118 to a source media device 104(2). In this illustration, the source media device 104(2) comprises a tablet. The application data 118 comprises information indicative of the application 106 executing on the target media device 104. The application data 118 is discussed in more detail below with regard to FIG. 2.

The source media device 104(2) may execute a virtual controller client module 120. The virtual controller client module 120 is configured to access virtual controller data 122 to present a virtual controller user interface 124. The virtual controller data 122 provides information indicative of one or more virtual controls, how to present those virtual controls, and so forth. For example, the virtual controller data 122 may include graphics or icons for presentation on a touchscreen, information about on-screen positions for presentation and acceptance of user input, and so forth. The virtual controller data 122 is discussed in more detail below with regard to FIG. 2. The virtual controller user interface 124 may comprise graphical, audible, haptic, or other elements for presentation to the user 102 by way of the source media device 104(2). Examples of some implementations of the virtual controller user interface 124 are discussed below with regard to FIGS. 9-11.

The virtual controller client module 120 provides the virtual controller user interface 124 and accepts user input from the user 102. For example, the user input may comprise touches at various locations on a touch sensor of the touchscreen of the source media device 104(2). The user input is used to generate control data 126. The control data 126 may be sent by the communication module 114 of the source media device 104(2) to the target media device 104(1). In some implementations the control data 126 may comprise "raw" or unprocessed information associated with the user input. For example, "raw" control data may comprise information about the location of touches made to a touch sensor, such as "touch at coordinates X=934 and Y=10". In other implementations the control data 126 may be generated from processing the raw information to generate an output such as indicating a particular virtual control has been used, such as "Button A activated" or "Joystick Up". The control data 126 may thus comprise data indicative of particular user inputs made using input devices of the source media device 104(2). The control data 126 may also be generated by devices such as the physical controllers 116.

The virtual controller client module 120 may also be configured to maintain or acquire information such as logs or usage metrics associated with use of the virtual controller user interface 124, or other functions or operations of the source media device 104(2). This information may be provided to the target media device 104(1), or other devices such as a server.

The target media device 104(1) may execute a virtual controller server module 128. The virtual controller server module 128 is configured to access input configuration data 130, generate event data 132, coordinate use of one or more controllers, and so forth. The input configuration data 130 associates the control data 126 with event data 132. The event data 132 comprises information indicative of particular commands associated with activation of particular controls on a physical controller 116. For example, the input configuration data 130 may associate the control data 126 of "touch at coordinates X=934 and Y=10", which is indicative of a user input, with the event data 132 "Cmd_Button_A", which is indicative of activation of a particular control on the physical controller 116. From the perspective of the operating system of the target media device 104(1), the event data 132 is indistinguishable from inputs made locally to the target media device 104(1) by a physical controller 116, and are processed as such.

The virtual controller server module 128 may then inject the event data 132 into the OS module 112. Injection may include storing or writing the event data 132 into an input file, memory location, or queue read by the OS module 112 for information associated with user input. Once injected, the OS module 112 accepts and utilizes the event data 132 as indistinguishable from input received from a local input device, such as a physical controller 116. In one implementation the OS module 112 may comprise a version of the Android OS as promulgated by Google, Inc. of Mountain View, Calif. The injection may comprise inserting the event data 132 into a memory location, queue, or file which is read by a user level input subsystem of the OS module 112, such as "uinput" in the Android OS. As a result, the application 106 receives input from the user 102 as received from the virtual controller user interface 124 on the source media device 104(2).

The virtual controller server module 128 may be configured to support input from one or more controllers, such as physical controllers 116 and virtual controller user interfaces 124. For example, the four users 102(1)-(4) may be playing a game, Two users 102(1)-(2) may use virtual controller user interfaces 124, while the remaining two users 102(3)-(4) may use physical controllers 116. The virtual controller server module 128 may determine connections have been established to the various controllers. Based on this connection, a controller identifier or number may be assigned to each controller. The virtual controller server module 128 may lock the assignment of the controller identifier to a particular controller, such that while the application is configured to accept input previously assigned controller identifiers may not be changed. In this way, the application module 106 is provided with a set of controller identifiers and associated controllers which remain stable during the course of gameplay. When the application 106 is no longer determined to be accepting input from the controllers, the lock is released. Once released, controllers may be added, removed, controller identifiers may be reassigned, and so forth. For example, a disconnected controller may be dropped with a newly connected controller taking on the controller identifier.

In some implementations the virtual controller server module 128 may provide a user interface allowing the user 102 to administer the controllers. The user interface may be configured to present information about controllers including connection status, controller number, controller type, and so forth.

The virtual controller server module 128 or other modules may also be configured to maintain or acquire information such as logs or usage metrics associated with use of the virtual controller server module 128, or other functions or operations of the target media device 104(1). In some implementations, the virtual controller server module 128 may receive information such as logs or usage metrics from the virtual controller client module 120. This information may be provided to another device, such as a server 134.

As described above, the roles of "source" and "target" may change over time for a particular media device 104. In some implementations, the media device 104 may have available for execution both the virtual controller client module 120 and the virtual controller server module 128.

The media devices 104 may be in communication with one or more servers 134(1), 134(2), . . . , 134(S). These servers 134 may provide various functions to the media devices 104. For example, the servers 134 may send or stream content, distribute updates to the applications 106, and so forth. In some implementations the servers 134 may receive the application data 118, the control data 126, and so forth, and direct this information to one or more of the other media devices 104. For example, the server 134 may receive application data 118 from the media device 104(1) and provide to the media devices 104(2)-(D).

While the servers 134 are depicted as single servers, in some implementations the servers 134 or the functions attributed to the servers 134 may be provided by a plurality of devices. For example, the server 134 may be implemented as a virtualized server executing across a plurality of physical servers. Likewise, other servers may be similarly configured.

A developer 136 may use a computing device 138 to communicate with the one or more servers 134. For example, the developer 136 may have created a new application 106(2) and is uploading the new application 106(2) to the one or more servers 134 for distribution to the media devices 104. The server 134 may execute an intake module 140 configured to analyze the application 106. The analysis may include determining one or more application inputs associated with the application 106. The application inputs may include inputs validly made to the application 106 and which may affect the operation of the application 106 in response thereto. The intake module 140 may use one or more techniques to determine the application inputs for the application 106. These may include applying a plurality of pre-determined inputs to the application 106 during execution, generating decompiled code of the application 106 and analyzing the decompiled code to identify application inputs, inspecting a manifest file associated with the application 106, analyzing one or more user interface elements provided by the application 106 during execution, and so forth. These techniques are described in more detail below with regard to FIG. 4. The intake module 140 may use the information about the application inputs for application 106 and generate the input configuration data 130. The intake module 140 may also be configured to associate virtual controller data 122 with the application 106. For example, the application 106(1) may be associated with the virtual controller user interface 124(1), while the application 106(2) is associated with the virtual controller user interface 124(2).

A metric module 142 may also execute on the server 134. The metric module 142 may be configured to receive information such as logs, metrics, and so forth from the media devices 104. This information may be used to improve operation of the system 100. For example, information about latency in delivery of control data 126 to the target media device 104(1) may be used to modify operation of the virtual controller client module 120 to use a different data transport mechanism.

Figure 2:
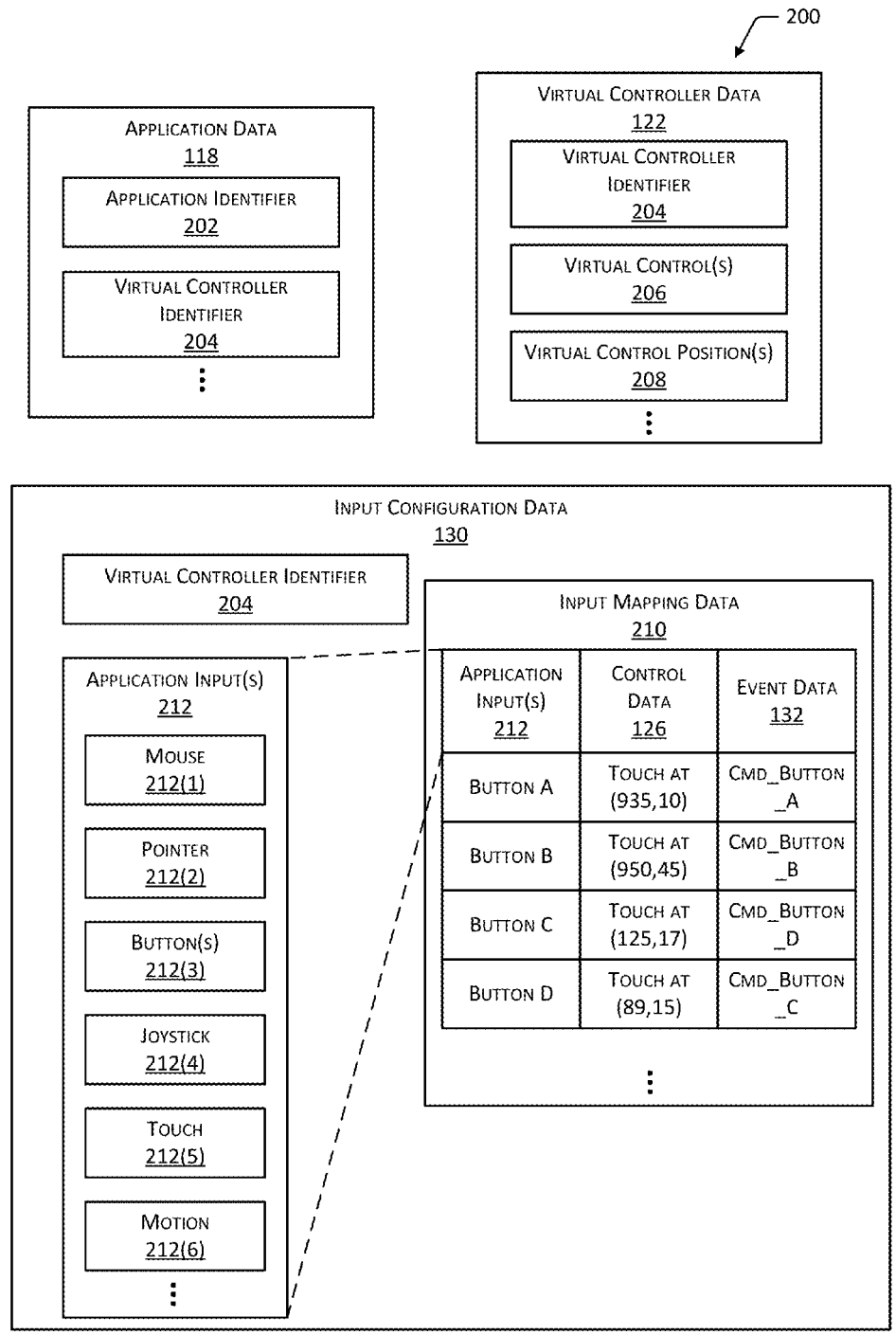
FIG. 2 is a block diagram of application data indicating the application executing on the target media device, virtual controller data used to provide a virtual controller user interface on the source media device, and input configuration data which maps user inputs to particular event data which is provided to the application.

FIG. 2 is a block diagram 200 of the application data 118, the virtual controller data 122, and the input configuration data 130.

The application data 118 comprises information indicative of the application 106 executing on the target media device 104(1). The application data 118 may include an application identifier 202. The application identifier 202 indicates the application 106 is executing at least in part on the target media device 104(1). The application identifier 202 may include a string, binary data, hash value, and so forth. In some implementations additional information such as an application version, operating system of the executing device, and so forth may be provided. The application data 118 may include a virtual controller identifier 204. The virtual controller identifier 204 provides information indicative of a particular virtual controller user interface 124. In some implementations the application data 118 may include information such as applications 106 which have been terminated, suspended, or are otherwise not executing on the media device 104.

The virtual controller data 122 provides information indicative of one or more virtual controls 206. For example, the virtual controls 206 may include virtual buttons, virtual joysticks, and so forth. In some implementations, the virtual controls 206 are configured to simulate controls available on a physical controller 116. This simulation may include one or more of controls, control placement, visual appearance of the controls, and so forth. The virtual controller data 122 may include graphics, icons, or other data configured to generate a representation of the virtual control 206 in the virtual controller user interface 124. The virtual controller data 122 may also include virtual control position(s) 208. This information may specify the location within the virtual controller user interface 124 for a particular virtual control 206. For example, the virtual joystick virtual control 206(1) may be centered at location X=110 and Y=37. The coordinates used in this disclosure are given for ease of illustration, and not by way of limitation. The coordinates may be specific with a particular touch sensor or other input device, or may be relative within a normalized or abstract space which may then be customized to the particular input device. The virtual controller data 122 may also include other information. In some implementations the virtual controller data 122 may be pre-loaded to the source media device 104(2), transferred to the source media device 104(2) as requested by the virtual controller client module 120, sent with or included in the application data 118, and so forth. The virtual controller data 122 may include a virtual controller identifier 204, which may be used to distinguish or reference a particular one set of virtual controller data from another.

The input configuration data 130 associates the control data 126 indicative of particular user inputs with event data 132. The event data 132 comprises information indicative of particular commands associated with activation of particular controls on a physical controller 116. The input configuration data 130 may include a virtual controller identifier 204 which allows for association of particular input configuration data 130 with a particular virtual controller user interface 124. The input configuration data 130 may include input mapping data 210. The input mapping data 210 associates one or more application inputs 212 with one or more of control data 126 or event data 132. The application inputs 212 include input devices or types of input which the application 106 will accept and respond to during execution. The application inputs 212 may include mouse 212(1), pointer 212(2), button(s) 212(3), joystick 212(4), touch 212(5), motion 212(6), and so forth. For example, the pointer 212(2) may include an input device configured to determine a point at which an input device is physically directed towards.

The input mapping data 210 may be used by the virtual controller server module 128 to associate received control data 126 with particular event data 132 for injection into the OS module 112 of the target media device 104(1). For example, as depicted here, the application input 212 of "Button B" is represented by user input at the source media device 104(2) which results in control data 126 of "Touch at (950,45)". The application input 212, and associated control data 126, are associated with the event data 132 "Cmd_Button_B". The event data 132 may comprise a particular command, function, string, or other value which is configured to be interpreted by the OS module 112 as a particular input.

The input mapping data 210 may be modified to allow for customized remapping of particular control data 126 to different event data 132. For example, the user 102 may use a custom mapping in which the virtual control 206 for a "C" action button is provided to the application 106 as a "D" action button, and the virtual control 206 for a "D" action button is provided to the application 106 as a "C" action button. As shown here, the input mapping data 210 has the event data 132 swapped to provide this remapping.

In some implementations the input mapping data 210 may provide a translation from otherwise dissimilar inputs. For example, the application module 106 may be configured to respond to touch application inputs 212(5) while the user is using a virtual controller having one or more virtual controls 206 such as action buttons. Continuing the example, a virtual controller user interface 124 may present a virtual gamepad such as presented in FIG. 9. The user 102 may activate a virtual control 206 by entering a touch at coordinates (957, 300). This user input may be mapped by the input mapping data 210 to generate event data 132 indicative of a touch input of "touch at (127, 29)" which the application 106 is expecting as input.

The virtual controller server module 128, by using the input mapping data 210, may thus allow a user to use the virtual controls 206 of the virtual controller user interface 124 to provide input to an application 106 which is configured to operate using input from a touch sensor. Similarly, the application 106 which would otherwise require a physical controller 116 may be readily controlled user input to a touch sensor.

The data in this disclosure may be stored as flat files, linked lists, executable code, scripts, tables, or other data structures. For example, the input configuration data 130 may be stored as one or more tables.

Figure 3:
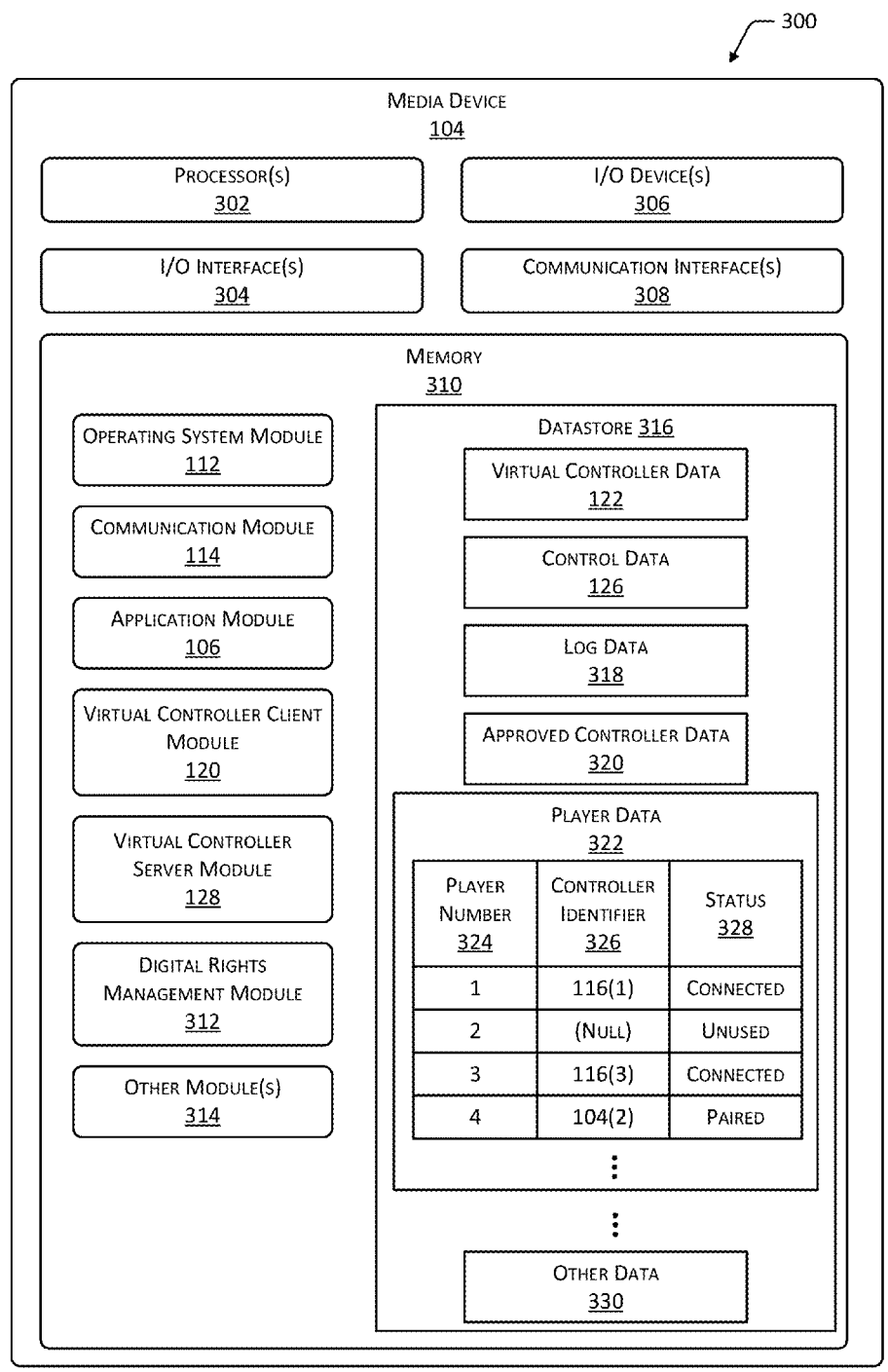
FIG. 3 illustrates a block diagram of a media device.

FIG. 3 illustrates a block diagram 300 of the media device 104. The media device 104 may include one or more hardware processors 302 ("processors") configured to execute one or more stored instructions. The processors 302 may comprise one or more cores. The media device 104 may include one or more input/output ("I/O") interface(s) 304 to allow the processor 302 or other portions of the media device 104 to communicate with other devices. The I/O interfaces 304 may comprise inter-integrated circuit ("I2C"), serial peripheral interface bus ("SPI"), Universal Serial Bus ("USB") as promulgated by the USB Implementers Forum, RS-232, one or more media device interfaces such as High Definition Multimedia Interface ("HDMI") as promulgated by HDMI Licensing LLC, TOSLINK as promulgated by Toshiba Corp., analog video, analog audio, IEEE 3394 as promulgated by the Institute for Electrical and Electronics Engineers, and so forth.

The I/O interface(s) 304 may couple to one or more I/O devices 306. The I/O devices 306 may include input devices such as one or more of a camera, a microphone, a touch sensor, a button, range camera, accelerometer, gyroscope, magnetometer, tilt sensor, and so forth. The I/O devices 306 may also include output devices such as one or more of a display, audio speakers, haptic output device and so forth. In some embodiments, the I/O devices 306 may be physically incorporated with the media device 104 or may be externally placed.

The media device 104 may also include one or more communication interfaces 308. The communication interfaces 308 are configured to provide communications between the media device 104 and other devices, such as other media devices 104, routers, access points, the servers 134, and so forth. The communication interfaces 308 may include personal area networks, wired and wireless LANs 108, wired and wireless wide area networks ("WANs") 110, and so forth. For example, Ethernet, Wi-Fi, Bluetooth, ZigBee, and so forth.

The media device 104 may also include one or more busses or other internal communications hardware or software that allow for the transfer of data between the various modules and components of the media device 104.

As shown in FIG. 3, the media device 104 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium and so forth. The memory 310 provides storage of computer readable instructions, data structures, program modules and other data for the operation of the media device 104.

The memory 310 may include at least one OS module 112. The OS module 112 is configured to manage hardware resource devices such as the I/O interfaces 304, the I/O devices 306, the communication interfaces 308, and provide various services to applications or modules executing on the processors 302. The OS module 112 may implement a variation of the Linux operating system, such as Android as promulgated by Google, Inc. Other OS modules 112 may be used, such as the iOS operating system from Apple, Inc. of Cupertino, Calif., the Windows operating system from Microsoft Corporation of Redmond, Wash., the LynxOS from LynxWorks of San Jose, Calif., and so forth.

The OS module 112 may be configured to generate at least a portion of the information in the application data 118. For example, the OS module 112 may be configured to log and report to the virtual controller server module 128 the application identifier 202 of the application 106 executing at least in part on the one or more processors 302. In some implementations information indicative of termination or suspension of the application 106 may also be provided.

In another implementation, a wrapper may be stored in the memory 310. The wrapper may comprise a separate module, or may be incorporated into another module such as the OS module 112, the virtual controller server module 128, and so forth. The wrapper module may implement a controller wrapper in which the controller wrapper initiates execution of the application 106, and generates the information indicative of the initiation. In some implementations the wrapper may be configured to generate information indicative of termination or suspension of the application 106. For example, a wrapper may be configured to generate the application identifier 202 or other information indicative of the application 106 executing on the processor 302.

Also stored in the memory 310 may be one or more of the following modules. These modules may be executed as foreground applications, background tasks, daemons, and so forth.

As described above, the communication module 114 may be configured to participate in discovery of other media devices 104 and services they support or provide, exchange information, and so forth. The communication module 114 may provide a framework for establishing and using connections with the other media devices 104. The connections may be authenticated, encrypted, and so forth. The communication module 114 may include one or more transport modules. The transport modules are configured to provide functionality at a transport layer and establish and maintain communication channels that transfer bits from one media device 104 to another device. The communication module 114 may have multiple transport modules available contemporaneously. The functionality provided by the communication module 114 may be provided free from user intervention. For example, setup of transports, exchange of application data 118 and control data 126, and so forth, may occur without receiving user input.

One or more of the application modules 106 may be stored in the memory 310. The one or more application modules 106 provide functionality which is interactive with, or provides information to, the user 102. For example, an application module 106 may be a game which is playable by the user 102, a content player application for presenting other content such as movies or music, and so forth.

The virtual controller client module 120 may present the virtual controller user interface 124 on the media device 104. The virtual controller client module 120 may access virtual controller data 122 to use for presentation of the virtual controller user interface 124. For example, the virtual controller data 122 may include graphics and other information associated with one or more virtual controls 206, virtual control positions 208, and so forth. The virtual controller client module 120 may be active on the media device 104 which is acting as a source for control data 126 for an application 106 executing on another media device 104 acting as a target to receive the control data 126.

In some implementations, the virtual controller client module 120 may be configured to determine the application 106 is no longer executing, or otherwise no longer receiving user input. For example, the target media device 104(1) may provide application data 118 indicating the application 106 has been closed and is no longer executing. Continuing this example, the virtual controller client module 120 may discontinue presentation of the virtual controller user interface 124 associated with the now closed application 106.

The memory 310 may also store the virtual controller server module 128. As described above, the virtual controller server module 128 is configured to generate the event data 132 from the received control data 126. The virtual controller server module 128 may then inject the event data 132 into the OS module 112. Once injected, the OS module 112 accepts and utilizes the event data 132. To the application 106, the input as injected may be the same as input received from a physical controller 116 if attached to the target media device 104(1). The injection may comprise inserting the event data 132 into a user level input subsystem of the OS module 112, such as "uinput" in the Android OS. In other operating systems, other injection techniques may be used.

In some implementations the virtual controller server module 128, or other modules, may also be configured to predict or adapt to user input. The module may be configured to generate event data 132 based on a predicted user input. The prediction may be based on position of the input, such as actual touch, compared to the location of the virtual control 206.

The virtual controller server module 128 may be active on the media device 104 executing the application 106 which is a target for control data 126 received from the media device 104 acting as the source. As described above, the virtual controller client module 120 and the virtual controller server module 128 may execute contemporaneously on the same media device 104.

The virtual controller server module 128 may be configured to manage multiple controllers, both virtual and physical. For example, the virtual controller server module 128 may allow users 102 to add or remove controllers, change what controller is associated with a particular player, and so forth. Management of multiple remotes is discussed in more detail below with regard to FIG. 12.

A digital rights management module 312 may provide support for presenting or processing content which is protected using one or more digital rights management schemes. Other modules 314 may also be present.

The one or more processors 302 may execute the modules, including the application module 106, at least in part. For example, a portion of the application module 106 may execute on the server 134 while a portion of the application module 106 executes on the processor 302. In one implementation where the application 106 executes within a virtual machine on the server 134, the virtual controller server module 128 may be configured to execute in this virtual machine, and may receive the control data 126 associated therewith.

The memory 310 may also include a datastore 316 to store information. The datastore 316 may use a flat file, database, linked list, tree, executable code, script, or other data structure to store the information. In some implementations, the datastore 316 or a portion of the datastore 316 may be distributed across one or more other devices including servers 134, network attached storage devices and so forth.

The datastore 316 may store one or more of the virtual controller data 122, or the control data 126. The datastore 316 may also store log data 318. In some implementations log data 318 may be collected. The log data 318 may be generated by the media device 104, or received from another media device 104. For example, the target media device 104(1) may receive log data 318 from the source media device 104(2). The log data 318 may include a number of active target devices, number of active source devices, input latency data, data communication statistics, control session length data, source device operating system version, target device operating system version, and so forth.

Approved controller data 320 may be stored in the datastore 316. The approved controller data 320 comprises information indicative of particular controllers or types of controller which are suitable to acquire control data 126. The approved controller data 320 may include a list or other data structure which includes or excludes particular human interface devices from consideration as controllers. For example, the list may exclude computer mice and keyboards from being detected as controllers, but may include the source media device 104(2) and the physical controller 116.

The datastore 316 may also include player data 322. The player data 322 associates a player number 324 with a controller identifier 326. In some implementations this may comprise a one-to-one-correspondence. As described above, the controller may be the virtual controller provided by the source media device 104(2) or a physical controller 116. The player data 322 provides a mapping between a particular player number 324 and a particular controller. A single player number 324 may be associated with each controller identifier 326 corresponding to a controller which is available to provide input to the target media device 104(1).

The player number 324 may comprise a nonzero positive integer value indicative of a particular entity or object in an application such as a game which is configured to be responsive to input received from a controller during execution of the application. For example, the player number 324 may be indicative of a player within a game. This may be a unique player, such as "Alice" or a relative player, such as "Player 1" and "Player 2". The application module 106 may use the player number 324 or information based thereon to process event data 132, such as directing the event data 132 to move a particular character in the game.

The controller identifier 326 is indicative of a single controller. The controller identifier 326 may comprise a serial number, media access control address, universal unique identifier, Bluetooth identifier, device identifier, and so forth which is used to identify a particular controller. The controller identifier 326 may be stored and provided by the controller, or may be assigned by the OS module 112.

The player data 322 may generate the associations between the player number 324 and the controller identifier 326 in various ways. The controller identifier 326 may be associated with a player number 324 based on a time of connection with the target media device 104(1), predetermined hierarchy, and so forth.

In some implementations, the player data 322 may also include status 328 information for each combination of player number 324 and controller identifier 326. For example, the status 328 may indicate if a player number 324 is unused (that is, unassigned to a controller identifier 326), status of a controller associated with that controller identifier 326 such as connected or unusable, and so forth. Information based on the status 328 may be used during operation of the system, may be included in a user interface presented to the user 102, and so forth.

The datastore 316 may store other data 330 as well, such as user preferences, configuration files, other types of content, and so forth.

Figure 4:
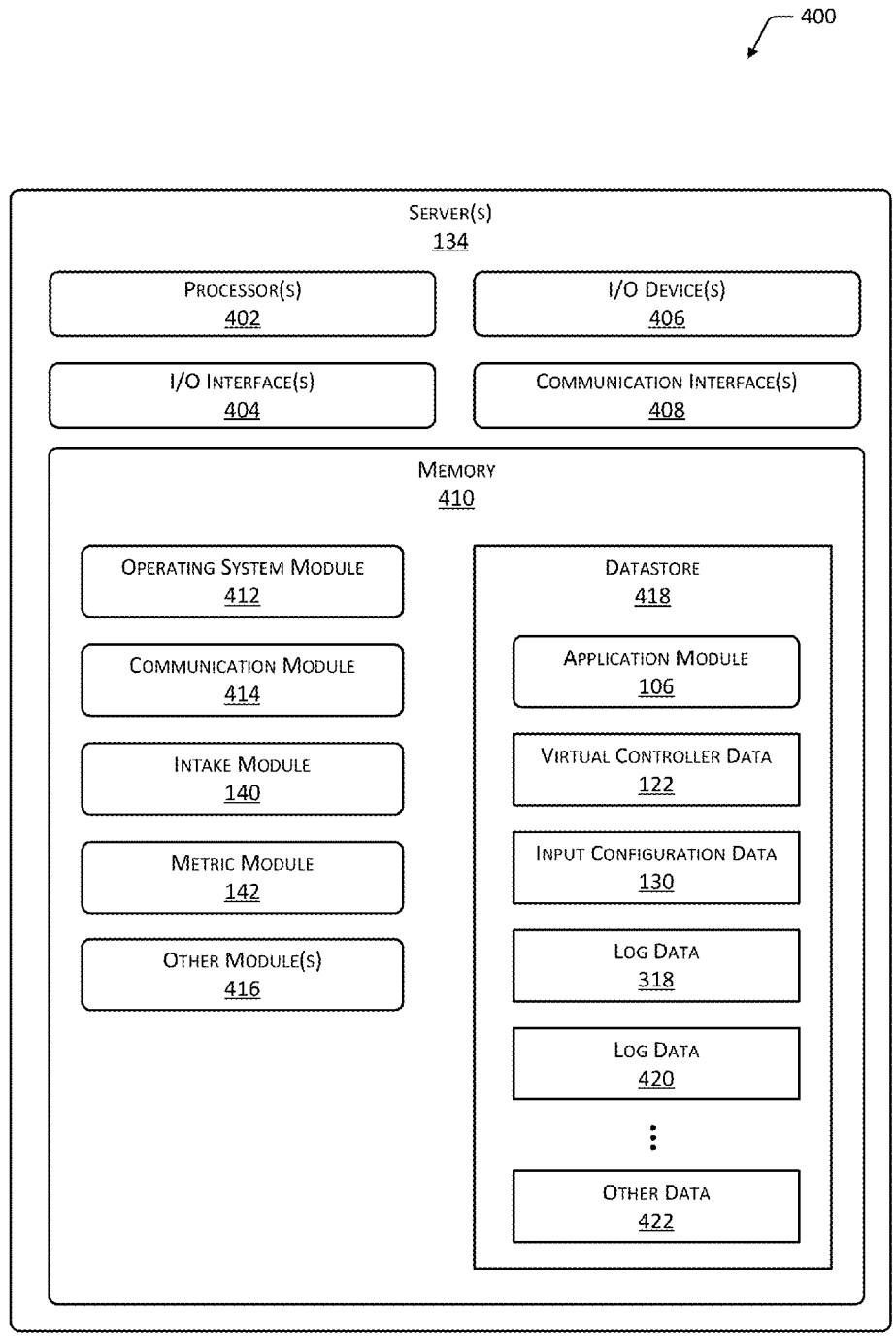
FIG. 4 illustrates a block diagram of a server which may determine one or more virtual controllers for use with a particular application.

FIG. 4 illustrates a block diagram 400 of the server 134. As described above, the server 134 may be configured to determine one or more virtual controllers for use with a particular application 106. The functions provided by the server 134 may be distributed across one or more physical or virtual devices.

The server 134 may include one or more hardware processors 402 ("processors") configured to execute one or more stored instructions. The processors 402 may comprise one or more cores. The server 134 may include one or more input/output ("I/O") interface(s) 404 to allow the processor 402 or other portions of the server 134 to communicate with other devices. The I/O interfaces 404 may comprise I2C, SPI, USB, RS-232, and so forth.

The I/O interface(s) 404 may couple to one or more I/O devices 406. The I/O devices 406 may include input devices such as one or more of a keyboard, mouse, scanner, and so forth. The I/O devices 406 may also include output devices such as one or more of a display, audio speakers, and so forth. In some embodiments, the I/O devices 406 may be physically incorporated with the server 134 or may be externally placed.

The server 134 may also include one or more communication interfaces 408. The communication interfaces 408 are configured to provide communications between the server 134 and other devices, such as the media devices 104, routers, access points, and so forth. The communication interfaces 408 may include personal area networks, wired and wireless LANs 108, wired and wireless WANs 110, and so forth.

The server 134 may also include one or more busses or other internal communications hardware or software that allow for the transfer of data between the various modules and components of the server 134.

As shown in FIG. 4, the server 134 includes one or more memories 410. The memory 410 comprises one or more CRSM as described above. The memory 410 provides storage of computer readable instructions, data structures, program modules and other data for the operation of the server 134.

The memory 410 may include at least one OS module 412. The OS module 412 is configured to manage hardware resource devices such as the I/O interfaces 404, the I/O devices 406, the communication interfaces 408, and provide various services to applications or modules executing on the processors 402. The OS module 412 may implement a variation of the Linux operating system as promulgated by Linus Torvalds, the Windows Server operating system from Microsoft Corporation of Redmond, Wash., and so forth.

Also stored in the memory 410 may be one or more of the following modules. These modules may be executed as foreground applications, background tasks, daemons, and so forth.

A communication module 414 may be configured to establish communications with one or more of the media devices 104, other servers 134, or other devices. The communications may be authenticated, encrypted, and so forth. The communication module 414 may be configured to communicate with the communication module 114 of the media devices 104.

The memory 410 may store the intake module 140. The intake module 140 may be configured to analyze the application 106. The analysis may include determining one or more application inputs 212 associated with the application 106. As described above, the application inputs 212 may include inputs validly made to the application 106 and which may affect the operation of the application 106 in response thereto.

The determination of the application inputs 212 may be manual. For example, the developer 136 or another person may provide information about what inputs are accepted by the application 106, generating the input configuration data 130 manually. However, existing collections of applications 106 may not have the input configuration data 130 available. Or, developers 136 may not provide the input configuration data 130.

The intake module 140 may use one or more techniques to determine the application inputs 212 for the application 106. These techniques may be fully or partially automated to eliminate or reduce manual input.

One technique comprises executing the application 106 and applying a plurality of pre-determined inputs to the application 106. For example, the pre-determined inputs may comprise all known possible inputs, such as mouse clicks at every point, activation of all known action buttons, touches at all points on a touch sensor, and so forth. Responses of the application 106 to these inputs may be analyzed to determine which of the inputs have elicited a response. This information may then be used to build the input mapping data 210.

Another technique involves analysis of the application 106. This analysis may include generating decompiled code of the application 106 and analyzing the decompiled code to identify application inputs 212. For example, the decompiled code may be analyzed for particular code snippets associated with application inputs 212, such as keyboard commands, accelerometer input, touch input 212(5), and so forth.

The intake module 140 may inspect a manifest or other file associated with the application 106. The manifest file may provide information associated with input devices required or execution of the application and so forth. For example, the manifest may be analyzed to look for particular tags associated with particular application inputs 212.

In another example, description data about the application 106 may be parsed. Continuing the example, a description saying "Whimsical Penguins is compatible with the Super-Grip Bluetooth Controller" may be analyzed to determine that a virtual controller user interface 124 which simulates the "SuperGrip Bluetooth Controller" may be appropriate.

In some implementations application data 118 associated with the application 106 may be used to determine the application inputs 212. For example, information about a particular game console or set-top box may be used to infer a particular set of application inputs 212.

The intake module 140 may analyze one or more user interface elements provided by the application 106 during execution. For example, a screenshot of the application 106 may be analyzed to look for buttons, directional controls, and so forth.

These techniques may be used individually or in various combinations to determine the application inputs 212 for the application 106. From this information, the input configuration data 130 may be generated. In some implementations, the intake module 140 may provide input configuration data 130 and the associated virtual controller data 122 to the media devices 104 of particular users 102, allowing for testing and verification. The user 102 may try the automatically generated input configuration data 130 and may provide feedback, modify input mapping data 210, and so forth. Once the input configuration data 130 has been determined to be sufficiently stable or operable, it may be deployed to other media devices 104 for other users 102 to use.

The intake module 140 may also be configured to associate virtual controller data 122 with the application 106. For example, the application 106(1) may be associated with the virtual controller user interface 124(1), while the application 106(2) is associated with the virtual controller user interface 124(2). This association may be based on a correspondence between the determined application inputs 212 and the virtual controls 206 for a given virtual controller specified by virtual controller data 122.

The memory 410 may store the metric module 142. As described above, the metric module 142 may be configured to receive information such as log data 318 from the media devices 104. This information may be used to improve operation of the system 100. The metric module 142 may be configured to acquire information such as number of downloads, installs, purchases of applications 106, virtual controller data 122, and so forth. The user 102 may be prompted to allow for the collection of the log data 318 or other information associated with use of the virtual controller. For example, the user 102 may "opt in" to provide log and metric information which may be used for improvement of the virtual controller.

Other modules 416 may also be present in the memory 410. For example, a digital rights management module may provide support for delivering applications 106 protected using one or more digital rights management schemes to the media devices 104.

The memory 410 may also include a datastore 418 to store information. The datastore 418 may use a flat file, database, linked list, tree, executable code, script, or other data structure to store the information. In some implementations, the datastore 418 or a portion of the datastore 418 may be distributed across one or more other devices including other servers 134, network attached storage devices and so forth.

The datastore 418 may include one or more of the application modules 106 for delivery or distribution to the media devices 104. The datastore 418 may store one or more of the virtual controller data 122, input configuration data 130, or log data 318 received from the media devices 104. The datastore 316 may also store log data 420 generated by the server 134 or other devices. For example, the log data 420 may comprise information about the delivery of application modules 106 to media devices 104, information about virtual controller data 122 provided to media devices 104, statistics associated with operation of the intake module 140, and so forth.

The datastore 418 may store other data 422 as well, such as user preferences, configuration files, other types of content, and so forth.

Illustrative Processes

Figure 5:
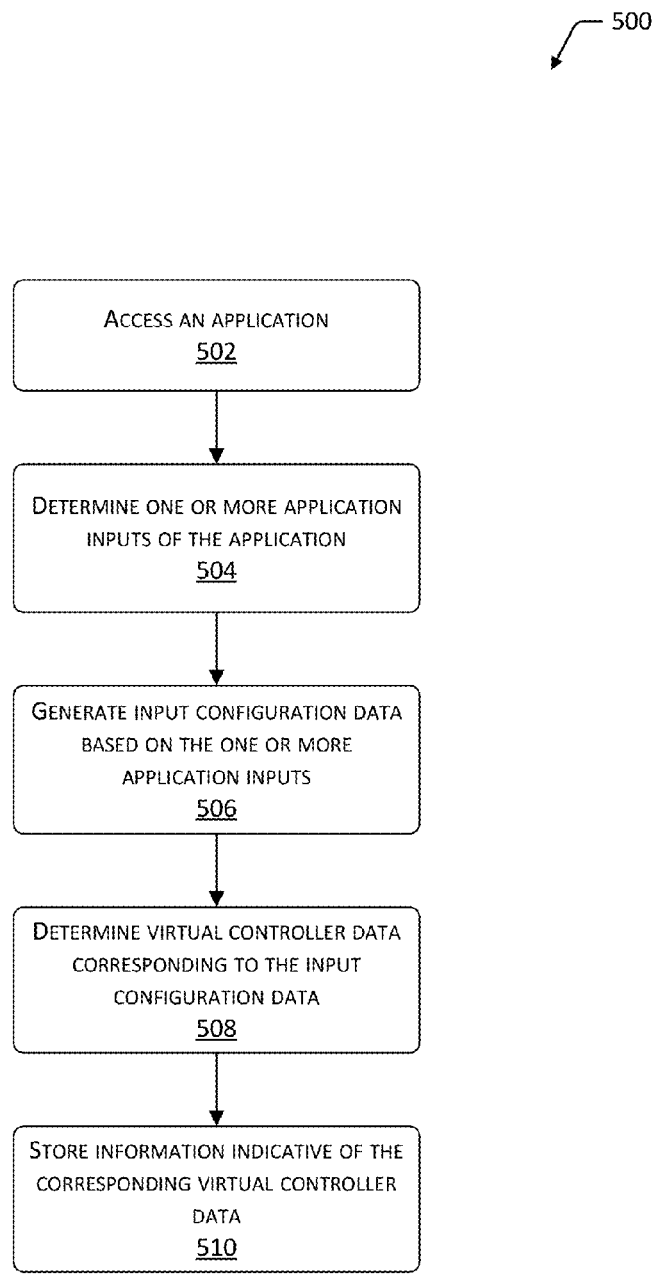
FIG. 5 illustrates a flow diagram of a process of associating an application with one or more virtual controllers.

FIG. 5 illustrates a flow diagram 500 of a process of associating an application 106 with one or more virtual controllers as defined by virtual controller data 122. This process may be performed at least in part by the intake module 140.

Block 502 accesses the application 106. For example, the intake module 140 may retrieve the application module 106 from the datastore 418. This application module 106 may be been received from the computing device 138 of the developer 136, or another party.

Block 504 determines one or more application inputs 212 associated with the application 106. As described above, the determination may comprise one or more of: applying a plurality of pre-determined inputs to the application 106 during execution, generating decompiled code of the application 106 and analyzing the decompiled code, inspecting a manifest file associated with the application 106, or analyzing one or more user interface elements provided by the application 106 during execution. In other implementations, other techniques may be used to determine the application inputs 212, including accepting manual input.

Block 506 generates the input configuration data 130 based on the one or more application inputs 212. For example, the application inputs 212 may be associated with particular control data 126 as received from the virtual controls 206. This control data 126 may be associated with particular event data 132.

Block 508 determines the virtual controller data 122 corresponding to the one or more application inputs 212. For example, based on application inputs 212 indicative of a joystick, a correspondence may be determined with the virtual controller data 122 which provides a virtual controller having a joystick virtual control 206. The association may be specific, such as a particular application 106 to particular virtual controller data 122. The association may be general, such as the application 106 is associated with a plurality of sets of virtual controller data 122 describing different virtual controllers.

Block 510 stores information indicative of the virtual controller data 122 corresponding to the application 106. For example, the virtual controller identifier 204 may be associated with the application identifier 202.

Figure 6:
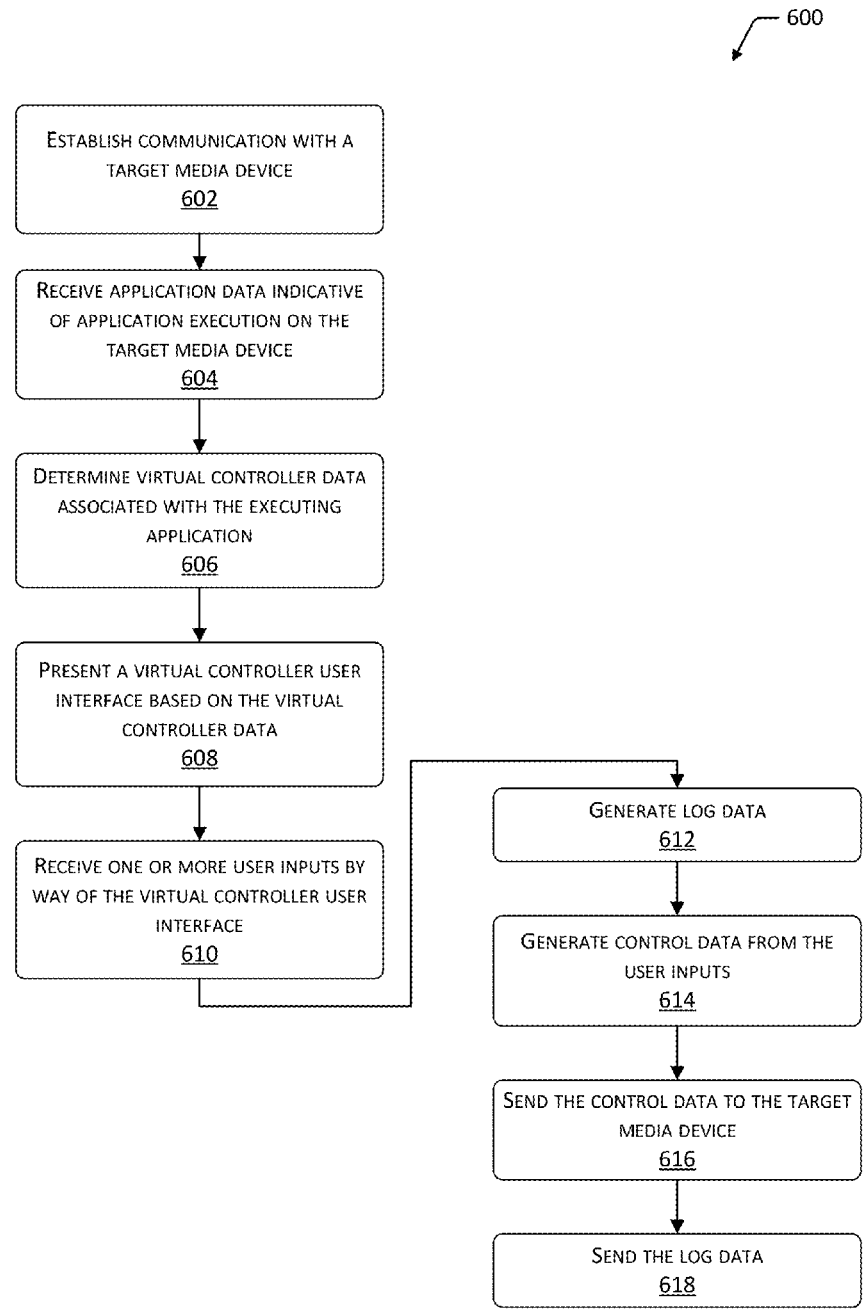
FIG. 6 illustrates a flow diagram of a process of a source media device generating control data from user inputs.

FIG. 6 illustrates a flow diagram 600 of a process of a source media device 104(2) generating control data 126 from user inputs to the virtual controller user interface 124. This process may be performed at least in part by the media device 104 acting as a source.

Block 602 establishes communication with a target media device 104(2). In some implementations the establishment may occur free from user intervention and may use one or more networks, such as the LANs 108, the WANs 110, and so forth. For example, the source media device 104(2) and the target media device 104(1) may establish data transport with one another without the user 102 providing input. These networks may be compliant with at least a portion of one or more standards including Wi-Fi, Wi-Fi Direct, Bluetooth, or Bluetooth Low Energy.

Block 604 receives application data 118 indicative of an application 106 executing on a target media device 104(1). As described above, the application data 118 may include the application identifier 202.

Block 606 determines virtual controller data 122 associated with the executing application 106. For example, the determination may comprise using a lookup table which associates the application identifier 202 with the virtual controller data 122. In one implementation, default virtual controller data 122 may be used. In this implementation, blocks 602 and 604 may be omitted.

Block 608 presents a virtual controller user interface 124 based on the virtual controller data 122. As described above, the virtual controller user interface 124 may comprise one or more virtual controls 206. The virtual controller user interface 124 may comprise images representative of one or more of the virtual controls 206. In some implementations, these images may be presented on a touchscreen comprising a touch sensor device and a display device configured to present visual information and accept touch input.

The virtual controls 206 may be representative of, or analogous to, controls presented by the application 106 or found on a physical controller 116. The virtual controls 206 may include directional pads comprising a plurality of buttons configured to indicate directionality such as up, down, left, and right. The virtual controls 206 may include action buttons which provide user input such as activated (with the button is depressed) or inactivated (when the button is not depressed). The virtual controls 206 may also include joysticks configured to accept directional input such as up, down, left, right, and diagonals between these.

The source media device 104(2) which is presenting the virtual controller user interface 124 may comprise a handheld device, such as a smartphone or tablet. One or more of the virtual controls 206 may be configured to be accessible to one or more thumbs while the source media device 104(2) is grasped.

Presentation of the virtual controller user interface 124 may be automatic upon determination of the executing application 106. For example, as the application 106 launches on the target media device 104(1), the source media device 104(2) may present the virtual controller user interface 124 which corresponds to that application 106.

In some implementations, the user 102 may manually select the virtual controller user interface 124 desired. For example, the user 102 may prefer to use a particular virtual controller user interface 124 which differs from that automatically provided. This preference may be saved and used in the future when the application 106 is later executed.

Block 610 receives one or more user inputs by way of the virtual controller user interface 124. For example, where the input device 306 of the source media device 104(1) comprises a touch sensor device, the one or more user inputs may comprise coordinates corresponding to one or more touches on the touch sensor device.

Block 612 generates log data 318. The log data 318 may comprise information associated with usage of the virtual controller user interface 124. For example, the log data 318 may include one or more of: number of active target devices, number of active source devices, input latency data, data communication statistics, control session length data, source device operating system version, target device operating system version, and so forth.

Block 614 generates control data 126 from the user inputs. As described above, the generating of the control data 126 may comprise associating one or more of the touches on the touch sensor device with a particular one of the virtual controls 206. For example, a touch at coordinates (935,10) corresponds to the virtual control for "Button A".

Block 616 sends the control data 126 to the target media device 104(1). For example, the communication module 114 may send the control data 126 using the LAN 108.

In one implementation, the virtual controller client module 120 of the source media device 104(2) may be configured to use the input configuration data 130 to generate event data 132. In this implementation, the event data 132 may be provided to the virtual controller server module 128 on the target media device 104(1).

Block 618 sends the log data 318. The log data 318 may be sent to the target media device 104(1), the servers 134, or another device. As with the control data 126, the communication module 114 may perform the sending.

Figure 7:
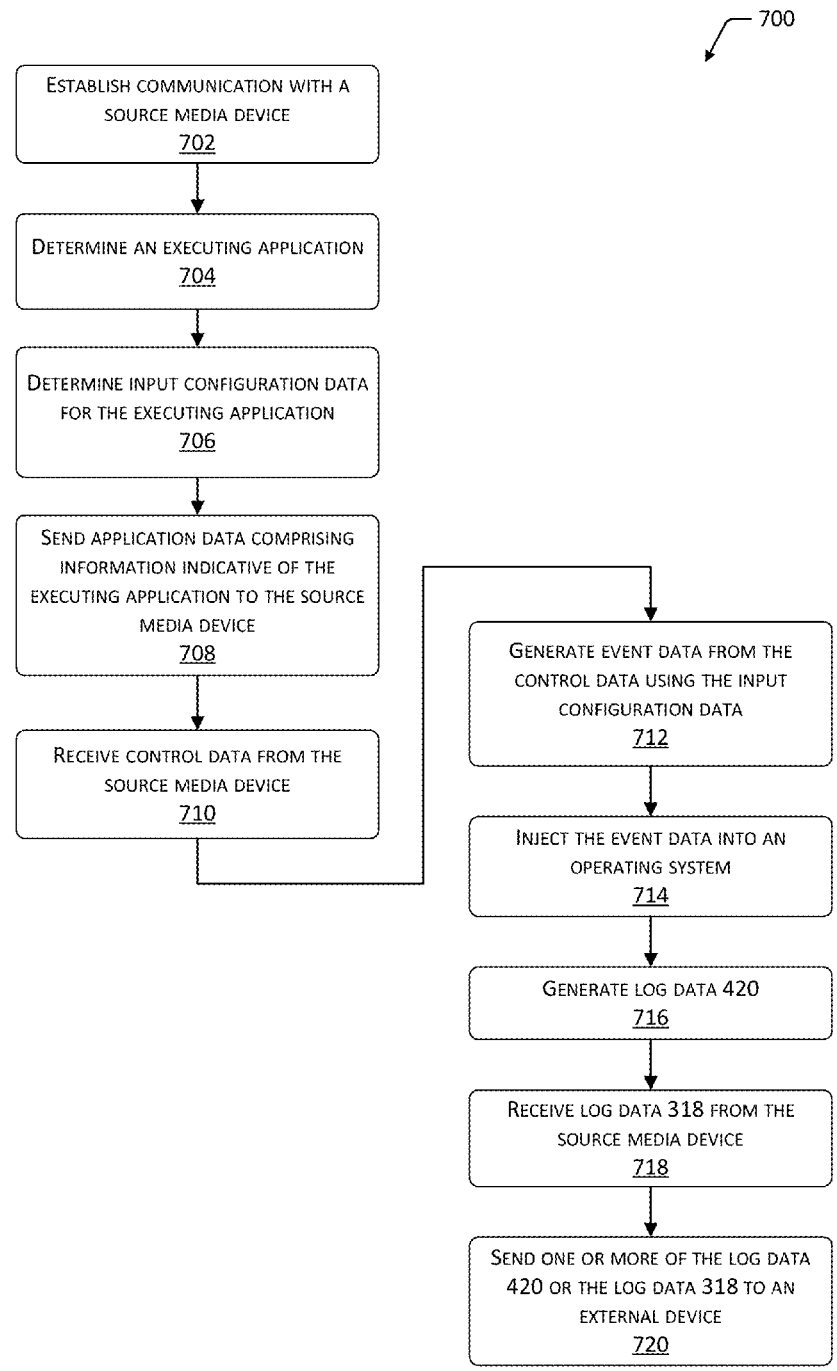
FIG. 7 illustrates a flow diagram of a process of a target media device injecting event data, generated from control data, into an operating system of the target media device.

FIG. 7 illustrates a flow diagram 700 of a process of a target media device 104(1) injecting event data 132, generated from control data 126, into the operating system module 112 of the target media device 104(1). This process may be performed at least in part by the media device 104 acting as a target.

Block 702 establishes communication with a source media device 104(2). As described above, in some implementations the establishment may occur free from user intervention and may use one or more networks, such as the LANs 108, the WANs 110, and so forth. For example, the source media device 104(2) and the target media device 104(1) may establish data transport with one another without the user 102 providing input. These networks may be compliant with at least a portion of one or more standards including Wi-Fi, Wi-Fi Direct, Bluetooth, or Bluetooth Low Energy.

Block 704 determines an application 106 executing on the processor 302 of the target media device 104(1). In one implementation, the determination may comprise polling the OS module 112 for executing applications 106. In another implementation, information may be provided by a controller wrapper configured to initiate execution of the application 106 and generate information indicative of the initiation.

Block 706 determines input configuration data 130 for the executing application 106. As described above, the input configuration data 130 may comprise input mapping data 210 associating user input as expressed in control data 126 from the source media device 104(2) to event data 132.

Block 708 sends application data 118 comprising information indicative of the executing application 106 to the source media device 104(2). For example, the information may comprise the application identifier 202. In some implementations the application data 118 may also include information indicative of the virtual controller data 122 for the virtual controller associated with the application 106. For example, the application data 118 may include a virtual controller identifier 204. In another implementation, the virtual controller data 122 may be provided to the source media device 104(2), which is configured to present the virtual controller user interface 124 on the source media device 104(2).

Block 710 receives control data 126 from the source media device 104(2). The control data 126 may be obtained from one or more virtual controls 206 presented by the virtual controller user interface 124. The control data 126 is thus indicative of one or more user inputs to the source media device 104(2).

Block 712 generates event data 132 from the control data 126 using the input configuration data 130.

As described above, in some implementations the source media device 104(2) may be configured to generate and send event data 132. In this implementation, the generation on the target media device 104(1) may be omitted.

Block 714 injects the event data 132 into an operating system module 112 executing on the processor of the target media device 104(1). This injection may include writing the event data 132 to a user level input subsystem of the operating system module 112. As described above, the operating system module 112 is configured to provide the event data 132 to the application 106 executing on the processor 302 of the target media device 104(1).

Block 716 generates log data 420. As described above, the log data 420 may include information indicative of operation of the target media device 104(1).

Block 718 receives log data 318 from the source media device 104(2). As described above, the log data 318 may include information indicative of operation of the source media device 104(2).

Block 720 sends one or more of the log data 420 or the log data 318 to an external device, such as the server 134. In some implementations the log data may be processed, and information based thereon may be sent to the external device.

Figure 8:
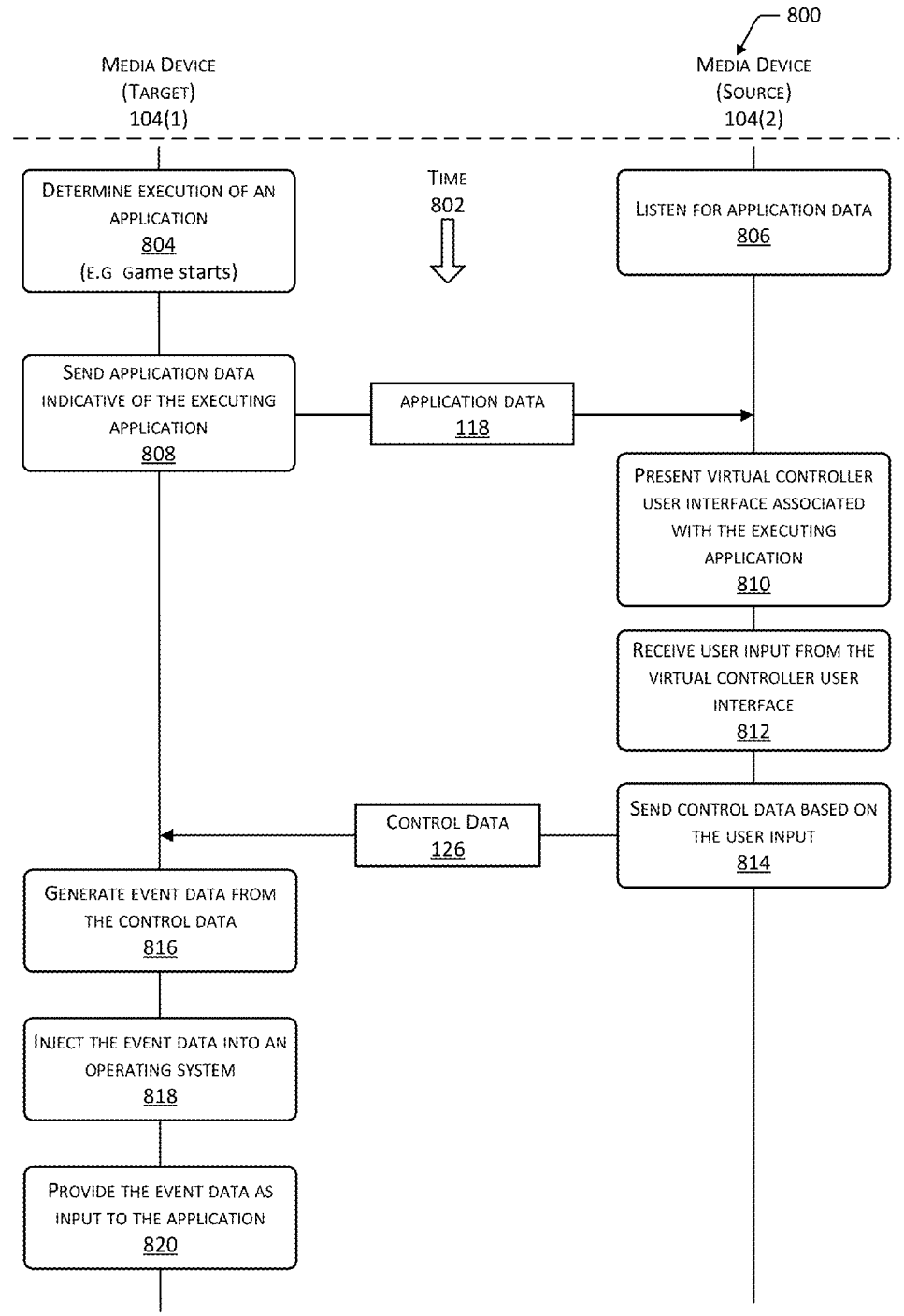
FIG. 8 illustrates a flow diagram of a process of the target media device interacting with the source media device to provide input to the application executing on the target media device.

FIG. 8 illustrates a flow diagram 800 of a process of the target media device 104(1) interacting with the source media device 104(2) to provide input to the application 106 executing at least in part on the target media device 104(1). This diagram again depicts the two media devices 104(1) and 104(2) for illustration and not by way of limitation. In some implementations, more than two media devices 104 may be involved. For example, multiple source media devices 104 providing input to multiple target media devices 104. Time 802 increases down the page as indicated by the arrow.

Block 804, executing on the target media device 104(1), determines execution of the application 106 on the target media device 104(1). For example, the game "Whimsical Penguins" is launched.

Block 806, executing on the source media device 104(2), listens for application data 118.

Block 808, executing on the target media device 104(1), sends application data 118 which is indicative of the executing application 106. For example, the application data 118 providing an application identifier 202 of "BZ12098409173" which corresponds to the game "Whimsical Penguins" may be sent.

Block 810, executing on the source media device 104(2), presents the virtual controller user interface 124 associated with the application 106 indicated in the application data 118. As described above, in some implementations the application data 118 may include information indicative of particular virtual controller data 122 used to provide a particular virtual controller user interface 124.

Block 812, executing on the source media device 104(2), receives user input from the virtual controller user interface 124. For example, the user 102 may activate virtual controls 206 presented on a touchscreen of the source media device 104(2).

Block 814, executing on the source media device 104(2), sends control data 126 based on the user input to the target media device 104(1). Block 816, executing on the target media device 104(1), generates event data 132 from the control data 126. Block 818, executing on the target media device 104(1), injects the event data 132 into the operating system module 112 of the target media device 104(1).

Block 820, executing on the target media device 104(1), provides the event data 132 as input to the application 106. For example, the OS module 112 may process the event data 132 and provide the corresponding commands to the application 106.

Illustrative Virtual Controller User Interfaces

The following virtual controller user interfaces 124 are provided by way of illustration, and not necessarily as limitations. In some implementations the relative positions, relative proportions, and so forth of portions of these user interfaces may vary. The virtual controller user interfaces 124 described below are presented on a touchscreen configured to present graphical information and accept touch inputs.

Figure 9:
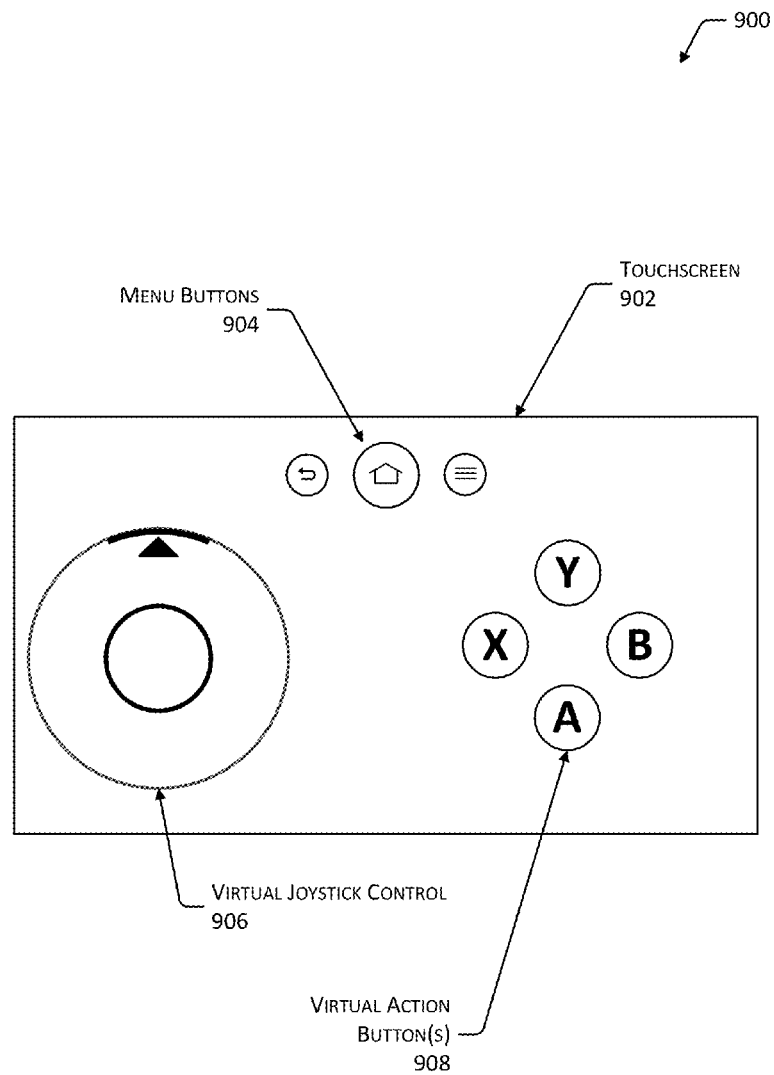
FIG. 9 illustrates an exemplary virtual controller user interface simulating a virtual joystick and four virtual action buttons configured for presentation on the source media device.

FIG. 9 illustrates an exemplary 900 virtual controller user interface 124. The virtual controller client module 120 may present the virtual controller user interface 124 on the source media device 104(2). The virtual controller user interface 124 is based on the information in the virtual controller data 122, such as the virtual controls 206, virtual control positions 208, and so forth.

In this example, a touchscreen 902 presents one or more menu buttons 904 towards a top center of the touchscreen 902. These menu buttons 904 may provide the user 102 with the ability to return to a home menu, configure the virtual controller user interface 124, and so forth.

Also presented on a left side of the touchscreen 902 is a virtual control 206 comprising a virtual joystick control 906. The virtual joystick control 906 is configured to simulate action of a physical joystick which may be manipulated by a finger or thumb of the user 102. For example, the user 102 may place a thumb of the left hand at approximately the center of the virtual joystick control 906, and slide the left thumb within a plane of the touchscreen 902 to generate touch inputs. The simulation may also approximate the placement of the virtual joystick control 906, visual appearance of the controls, and so forth. For example, a photorealistic version, or a photo of, the physical joystick control may be presented on the touchscreen display.

One or more virtual action buttons 908 are also presented on a right side of the touchscreen 902. In this illustration, four virtual action buttons 908 labeled "A", "B", "X", and "Y" are arranged in a diamond shape on the touchscreen 908. These virtual action buttons 908 may be configured to be accessible to a thumb of the right hand of the user 102 during operation.

In some implementations the position of the menu buttons 904, the virtual joystick control 906, the virtual action buttons 908, or other user interface elements may be presented in different positions. For example, a left handed user may prefer to have the virtual joystick control 906 on the right side of the touchscreen 902 and the virtual action buttons 908 on the left side. In another example, the spacing or positioning of the virtual action buttons 908 may be changed. For example, the "A" and "Y" buttons may be swapped, or the virtual action buttons 908 may be arranged in an arc, spacing between the virtual action buttons 908 may be increased or decreased, and so forth.

The relative size of the virtual controls 206 as presented on the touchscreen 902 may vary. For example, the virtual joystick control 906, the virtual action button 908, and so forth may be enlarged or reduced.

Modifications in the virtual controller user interface 124 may be provided. These modifications may be initiated by the server 134, received from the user 102, retrieved as previously stored, and so forth. In some implementations these modifications may occur automatically based on log data or other information accessible to the system 100. For example, based on analysis of touches made by the user 102 to activate the virtual action button 908 "A", the relative position of the "A" button may be shifted to a determined center, enlarged, and so forth.

The touchscreen 902 is depicted as oriented in a "landscape" mode, that is having a longest axis of the touchscreen 902 which is arranged left to right relative to the user 102. In other implementations the virtual controller user interface 124 may be presented in a "portrait" mode in which the longest axis of the touchscreen 902 is vertically relative to the user 102.

Other information may also be presented in the virtual controller user interface 124. For example, branding information such as a logo or phrase associated with a particular application 106 may be presented. In some implementations advertisements may also be presented within the virtual controller user interface 124.

Figure 10:
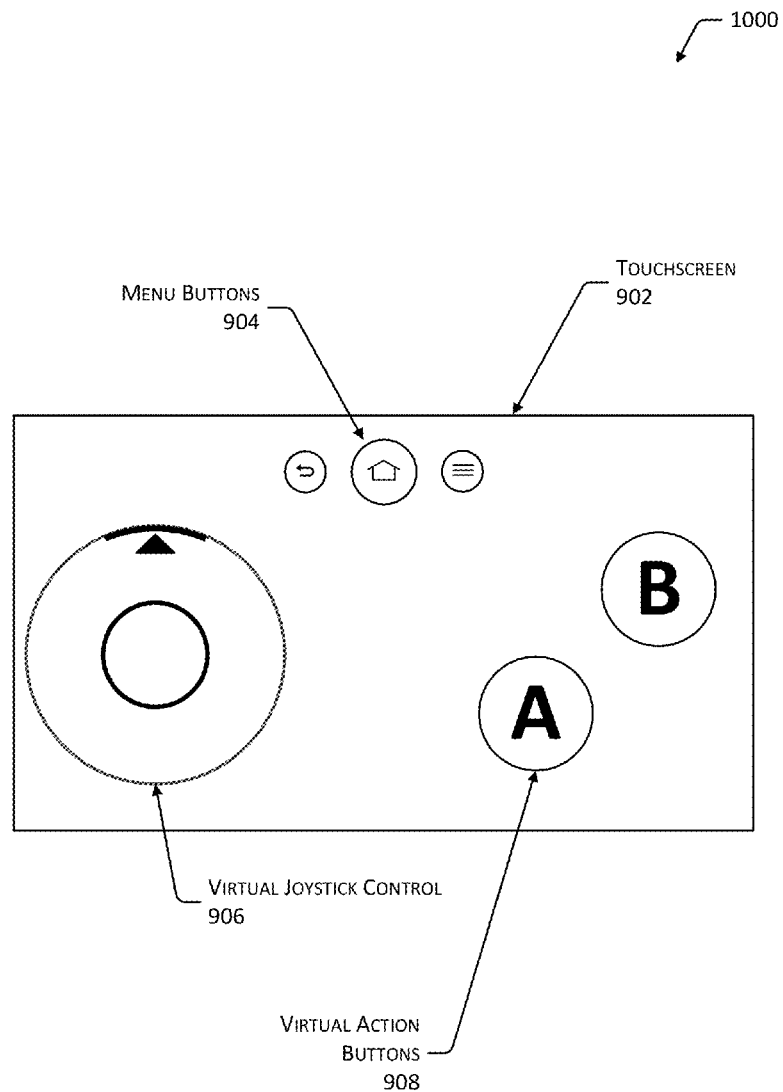
FIG. 10 illustrates an exemplary virtual controller user interface simulating a virtual joystick and two virtual action buttons configured for presentation on the source media device.

FIG. 10 illustrates an exemplary 1000 virtual controller user interface 124. In this example, the touchscreen 902 presents the menu buttons 904 towards a top center. Also presented is a single virtual joystick control 906 and two virtual action buttons 908 "A" and "B". Relative to the previously example in FIG. 9, the virtual action buttons 908 in FIG. 10 are relatively larger.

Figure 11:
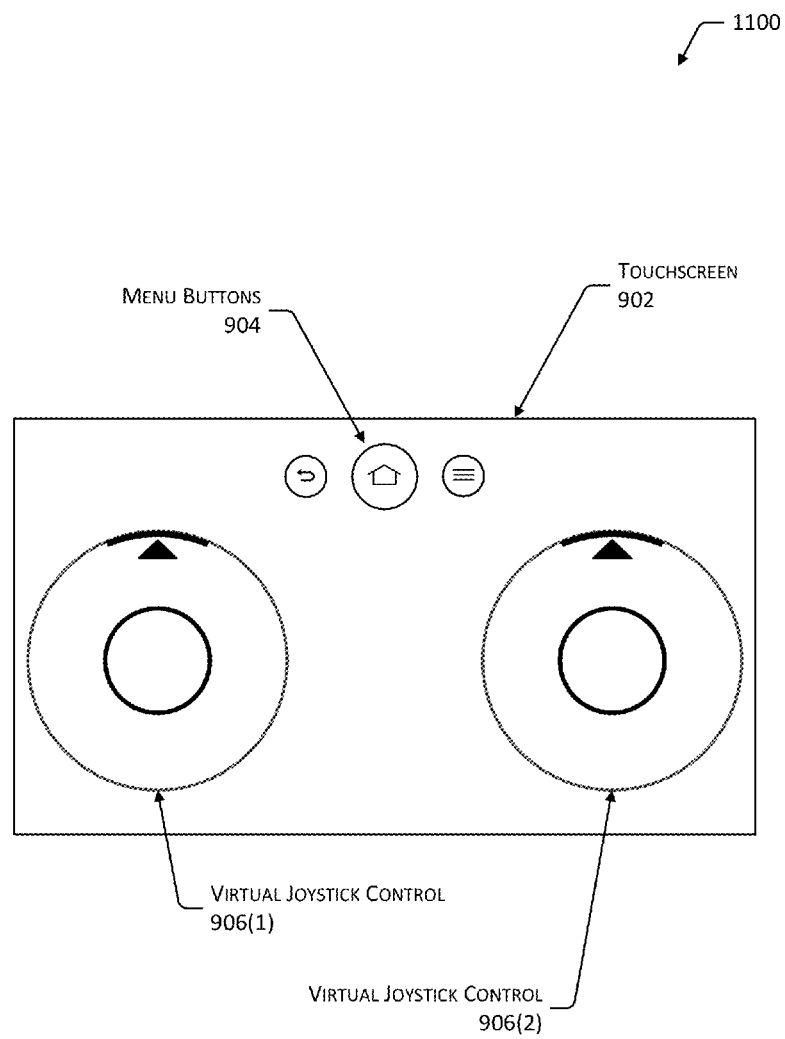
FIG. 11 illustrates an exemplary virtual controller user interface simulating a pair of virtual joysticks configured for presentation on the source media device.

FIG. 11 illustrates an exemplary 1100 virtual controller user interface 124. In this example, the touchscreen 902 presents the menu buttons 904 and a pair of virtual joystick controls 906(1) and 906(2). The virtual joystick controls 906(1) and (2) are arranged to the left and right sides of the touchscreen 902, respectively.

Figure 12:
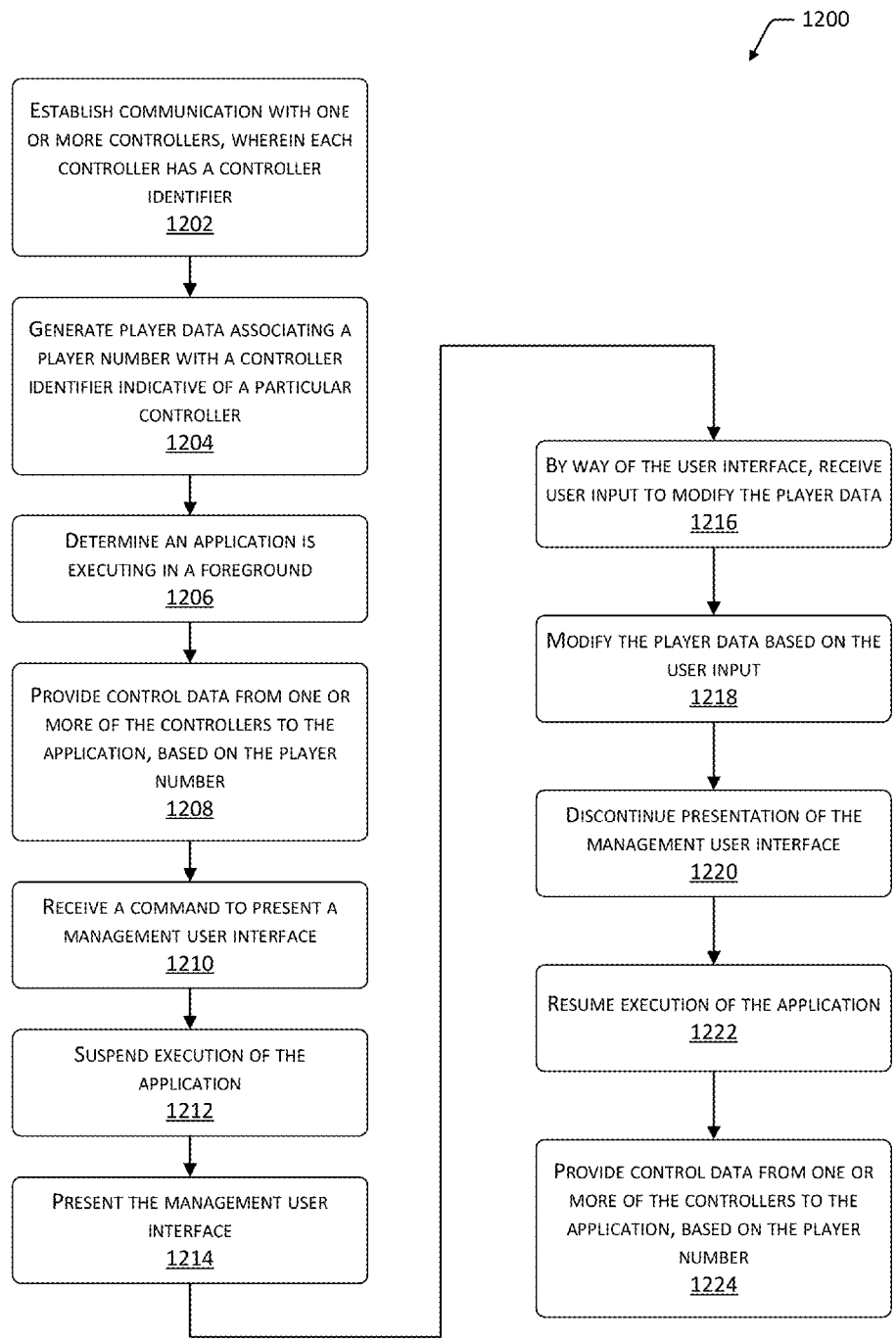
FIG. 12 illustrates a flow diagram of a process of the target media device managing multiple controllers.

FIG. 12 illustrates a flow diagram 1200 of a process of the target media device 104(1) managing one or more controllers. The process may be implemented at least in part by the target media device 104(1). The target media device 104(1) may be executing at least a portion of an application 106, such as a game. In some implementations, the entire application 106 may be executing on the target media device 104(1), or may be executed at least in part on one or more external devices such as the servers 134, or another media device 104.

Block 1202 establishes communication with the plurality of controllers. For example, a Bluetooth controller which is paired and connected is in communication with the target media device 104(1). As described above, the controllers may include one or more virtual controllers 206 comprising a media device 104 executing a virtual controller client module 120 to provide a virtual controller user interface 124 and generate control data 126. The controllers may also include the physical controllers 116. Different controllers may be connected to the target media device 104(1) simultaneously by way of the same or different communication protocols or transports.

In some implementations, input devices which are in communication with the target media device 104(1) may not be suitable for use as controllers. Data designating particular input devices or types of input devices as controllers able to provide control data 126 for use by the application may be maintained. For example, a list of game controllers may be maintained, which excludes input devices such as computer mice, keyboards, and so forth. Input devices to which communication has been established and which are designated as controllers may then be presented in the OS module 112 as controllers. Those input devices which are not designated as controllers, may be omitted. For example, a handheld physical controller 116 may be able to be assigned a player number 324, while a computer mouse may not even appear within a management user interface and may not be assigned a player number 324.

Block 1204 generates player data 322 which associates a player number 324 with a controller identifier 326 indicative of a particular controller. As described above, the player number 324 may be expressed as a nonzero positive integer value indicative of a particular entity or object in a game or other application which is configured to be responsive to input received from a controller during use. In implementations where the application is a game, the player number 324 may designate a player within the game.

Generation of the player data 322 may occur automatically, under the direction of the user 102, or a combination thereof. In one implementation, player data 322 may be generated by assigning player numbers 324 in numerical sequence beginning at an origin number to controllers in the order in which the controllers establish communication with the target media device 104(1). For example, after the target media device 104(1) has started up, the first controller which is connected with the target media device 104(1) may be assigned player number 324 "1", while the second controller which is connected is assigned player number 324 "2", and so forth. As communication is established with additional controllers, the corresponding controller identifiers 326 for these additional controllers may be assigned player numbers 324 which are unused.

In some implementations, all available controllers may be added to the player data 322 automatically, or the user 102 may manually associate controllers with particular player numbers 324 by way of the management user interface described below.

Block 1206 determines the application is responsive to the control data 126, or other input from the user 102. This determination may be based at least in part on accessing data maintained by a process scheduler of the OS module 112. For example, the process scheduler may maintain a list or other data structure which indicates which applications are in the foreground, or in the background. The application is responsive to the control data 126 when executing in a foreground of the operating system and is unresponsive to the control data 126 when executing in a background of the operating system.

Block 1208 provides, based on the player number 324, control data 126 from the plurality of controllers to the application 106. In some implementations, the control data 126 or corresponding event data 132 may be provided to the application 106 by writing the control data 126 or event data 132 to a memory location used by the application to accept input. As described above, the control data 126 comprises data indicative of input from a user 102 by way of one or more controls on a controller. The control data 126 may be generated by the virtual controller client module 120, or by a physical controller 116.

Block 1210 receives a command to present a management user interface. For example, the user 102 may press a button on one of the controllers which is configured to invoke the management user interface. The OS module 112 or the application may issue the command to present the management user interface.

In some implementations one or more indicator lights 144 of the controller may be activated to indicate the player number 324. The indicator lights 144 may be configured to be active while the management user interface is presented, and be deactivated when the management user interface is not. For example, this may be done to reduce distraction to the user 102 during game play, to reduce power consumption of the controller by turning off the indicator lights 144, and so forth. This process is discussed in more detail below with regard to FIG. 13.

Block 1212 suspends execution of the application 106 such that the application becomes unresponsive to the control data 126. For example, a process scheduler of the OS module 112 may transition the application 106 to a background state in which execution of one or more processes of the application 106 are no longer interactive with respect to input of the user 102.

Block 1214 presents the management user interface. For example, the management user interface may be visually presented on the display device, audibly presented by way of one or more speakers, and so forth. The visual presentation of the management interface may include one or more graphical user interface elements configured for presentation on the display device. These graphical user interface elements may include one or more of buttons, sliders, check boxes, combo boxes, dialog boxes, radio buttons, and so forth.

In some implementations, the management user interface may be configured to occupy a portion of a display area, while at least a portion of the application 106 which has been suspended remains visible.

By way of the management user interface, block 1216 receives user input to modify the player data 322. For example, the user 102 may wish to reassign the controller identified by controller identifier 326 of "116(1)" currently associated with the player number 324 "1" will be swapped with the player number 324 "3" which is currently associated with the player number 324 "3".

The OS module 112 or the application 106 may determine that the player data 322 does not include a controller able to provide the control data 126 to the application 106. For example, upon execution of the game, the OS module 112 may determine that the player data 322 has no player numbers 324 associated with any controller identifiers 326. The management user interface may then be configured to present a prompt or other input mechanism for the user 102 to add one or more controllers.

Block 1218 modifies the player data 322 based on the user input. For example, the player data 322 may be updated such that player number 324 "1" is now associated with controller identifier 326 of "116(3)" and player number "3" is associated with controller identifier 326 "116(1)".

The modification of the player data 322 based on the user input may include one or more of: assigning an unused player number 324 to a controller identifier 326, removing an association between a used player number 324 and a controller identifier 326, reordering the used player numbers 324 such that the controller identifier 326 is assigned another used player number 324, and so forth. For example, the user 102 may add a new controller for use in playing a game by assigning the controller the player number 324. A used player number 324 comprises a player number 324 which is currently associated with a controller identifier 326 in the player data 322, while an unused player number 324 comprises a player number 324 which is currently unassociated with the controller identifier 326.

Block 1220 discontinues presentation of the management user interface. For example, upon discontinuation, the graphical user interface may be removed from presentation on the display device. The management user interface may be discontinued based at least in part on one or more conditions. These conditions may include, activation of a user interface element configured to close the management user interface, reaching a timeout value after which the management user interface automatically closes, or determining all player numbers 324 are associated with respective controller identifiers 326. For example, presentation of the management user interface may be discontinued when the user 102 activates a control to close the management user interface.

Block 1222 resumes execution of the application 106, such that the application 106 becomes responsive to the control data 126. For example, the application 106 may be transitioned by scheduler of the OS module 112 to a foreground state. In some implementations, this transition may be initiated by the discontinuation of the management user interface.

Block 1224 provides, based on the player number 324, control data 126 from the plurality of controllers to the application 106. This may include writing the control data 126 to the memory location, input file, queue, and so forth used by the OS module 112 or the application to accept input. In some implementations, the control data 126 written to the memory location, input file, queue, and so forth may include information indicative of the player number 324, the controller identifier 326, or both. The OS module 112, or the application, may be configured to interpret the player number 324 or the controller identifier 326 such that the user input received by a particular controller directs a particular entity or object, such as a character, within the game.

By using the techniques and the system described above, users 102 may readily reconfigure controllers before or during game play. For example, the user 102 may switch from a physical controller 116 used during a first part of gameplay, to a virtual controller provided by the virtual controller client module 120 on the source media device 104(2), within the same game session.

Figure 13:
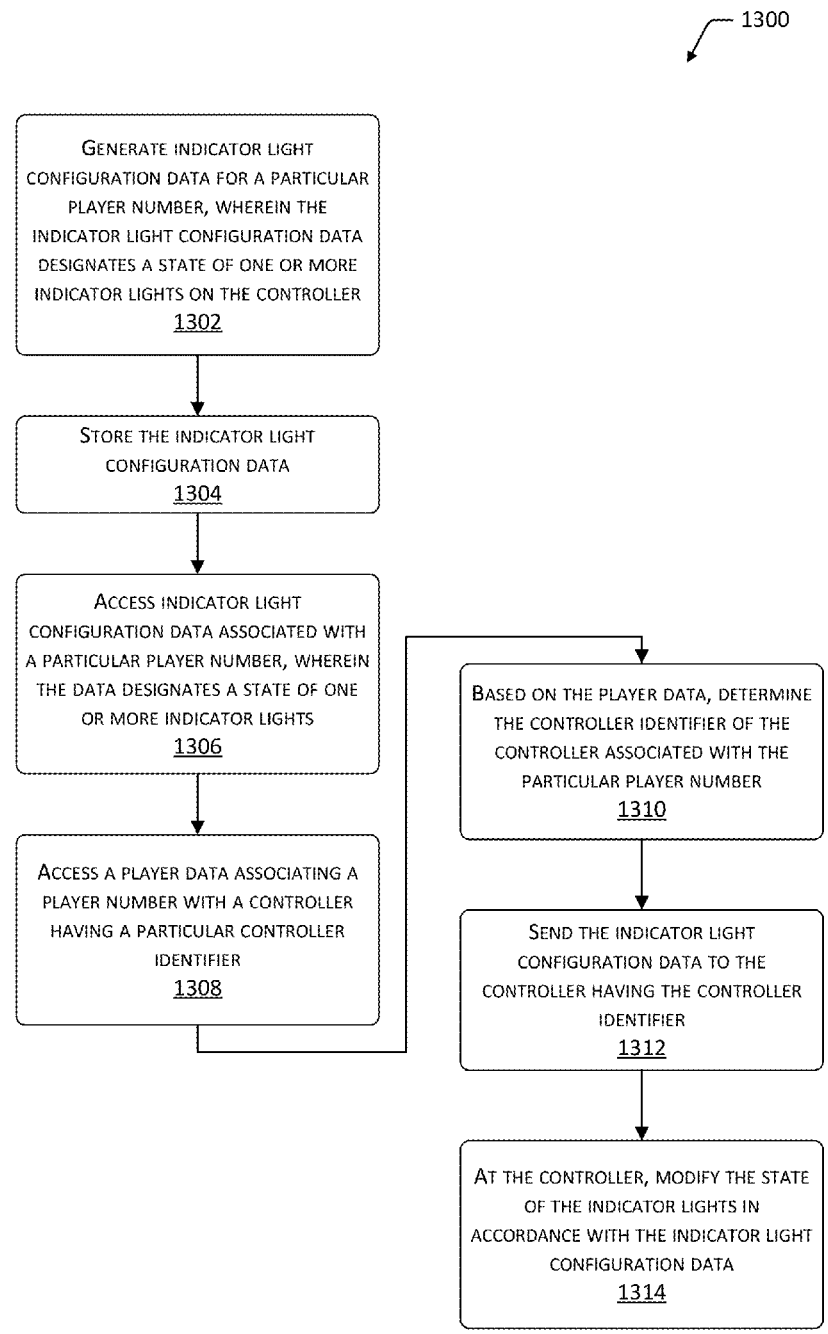
FIG. 13 illustrates a flow diagram of a process of the target media device controlling one or more indicator lights of the controllers.

FIG. 13 illustrates a flow diagram 1300 of a process of the target media device 104(1) controlling one or more indicator lights 144 of the controllers. The indicator lights 144 may be on the physical controllers 116, or may be indicator lights 144 which are present on the source media device 104(2). For example, the media device 104 may have a light emitting diode used for visual annunciation, such as a message waiting, power on, and so forth.

The indicator lights 144 may be used to provide information to the user 102. This information may include data indicative of the player number 324, information associated with gameplay, and so forth.

Block 1302 generates indicator light configuration data for a particular player number 324. The indicator light configuration data designates a state of indicator lights 144. For example, the indicator light configuration data may specify that light one in a leftmost position of a row is to be set "on", while lights two through four are to be set "off". The state of the indicator lights 144 may correspond to a value of the particular player number 324.

In other implementations, the indicator light configuration data may express other data, such as a low battery status 328 of the controller, number of lives remaining in the game, and so forth.

Block 1304 stores the indicator light configuration data. For example the indicator light configuration data may be written to memory.

Block 1306 accesses the indicator light configuration data associated with a particular player number 324. For example, the indicator light configuration data for the player number 324 "1" may be accessed.

Block 1308 accesses the player data 322 which associates the player number 324 with a controller having a particular controller identifier 326.

Based on the player data 322, block 1310 determines the controller identifier 326 of the controller associated with a particular player number 324.

Block 1312 sends the indicator light configuration data to the controller having the controller identifier 326. As described above, in some implementations activation of the one or more indicator lights 144 may be indicative of output from the game or application 106. For example, indicator lights 144 may be used to present information associated with gameplay, such as a number of lives remaining.

In some implementations, the indicator light configuration data for each of the controllers may be sent to the respective controllers after receiving the command to present the management user interface. For example, as the management user interface is presented, each of the connected controllers are thus configured to present their respective player number 324 by way of the indicator lights 144.

At the controller, block 1314 modifies the state of the indicator lights 144 in accordance with the indicator light configuration data. For example, continuing the example, the leftmost indicator light 144 may be set to "on" while the remaining indicator lights 144 are set to "off", indicating the player number 324 is "1".

In some implementations, additional indicator light configuration data may be sent to the controllers after discontinuation of the management user interface, or after receiving the user input to modify the player data 322. For example, the additional indicator light configuration data may deactivate the one or more indicator lights 144 on the controllers once the user 102 has finished reassigning the controllers, or once gameplay resumes. The indicator light configuration data may thus be used to turn on or turn off the indicator lights 144. This may be done to reduce visual distraction to the user 102 during game play, to minimize power consumption on the controller, and so forth.

Figure 14:
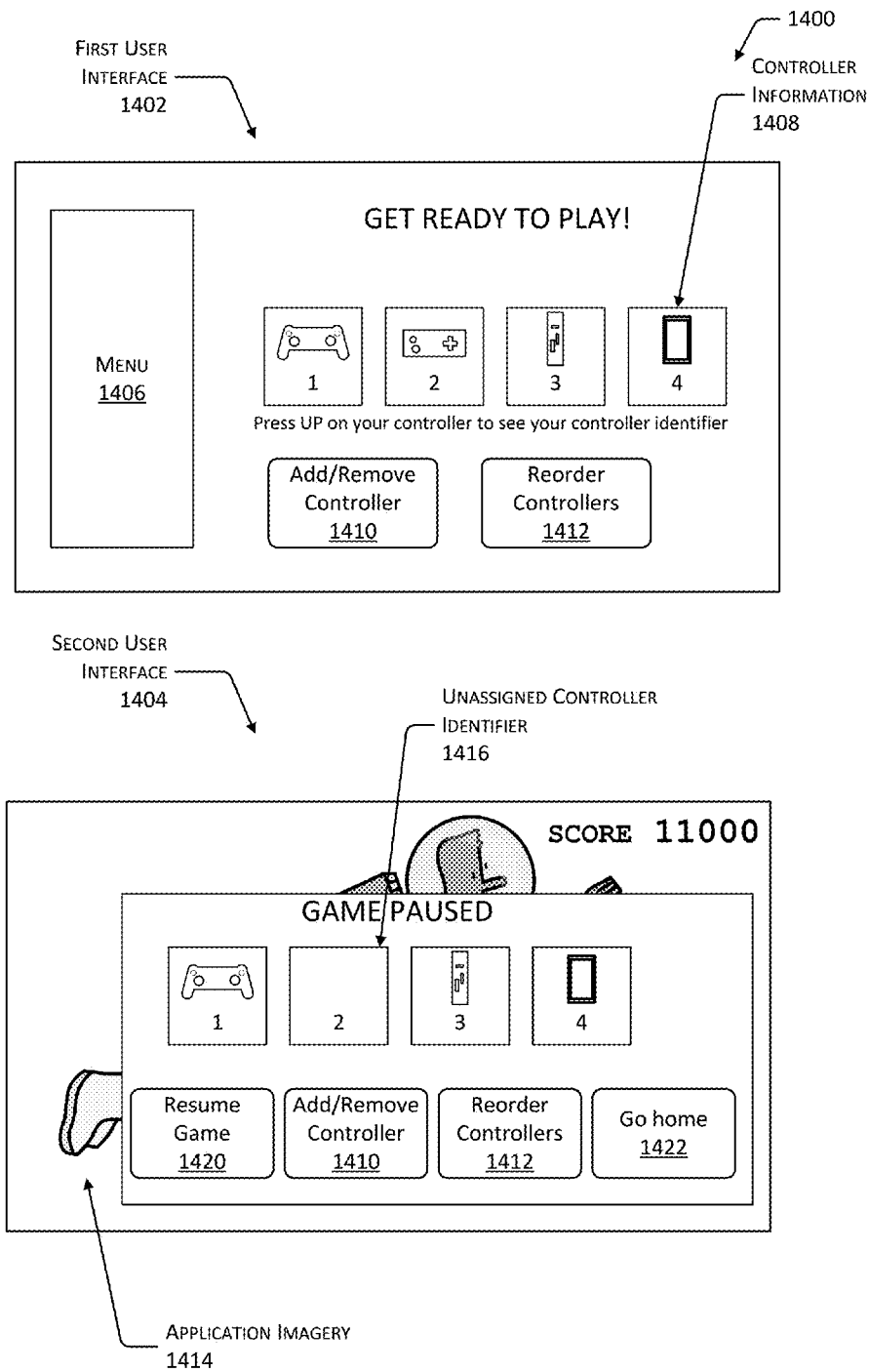
FIG. 14 illustrates exemplary user interfaces for managing multiple controllers available to the target media device to provide input to the application.

FIG. 14 illustrates an exemplary user interfaces 1400 for managing multiple controllers available to the target media device 104(1) to provide input to the application module 106. The user interfaces may be presented to the user 102 by way of one or more of visual elements, audible elements, or haptic elements.

In this illustration a first user interface 1402 depicts the state before the application module 106 is accepting input. For example, this may depict the user interface presented before game play begins. A second user interface 1404 depicts the user interface after gameplay has begun, such as when the application is executing on the processor.

The first user interface 1402 may include a menu 1406. The menu 1406 may include one or more items, such as a home menu control, options to access different types of content, and so forth. Controller information 1408 may be presented which presents information associated with the controller identifiers 326, which controllers (if any) are associated therewith, and so forth. For example, the controller identifiers 326 may be represented as non-zero integers, such as "1", "2", "3", and so forth. In some implementations the controller information 1408 may include a graphical depiction which is representative of the controller.

The controller information 1408 may include information indicative of the player data 322 including one or more player numbers 324 and the corresponding controllers for use by the application module 106. As described above, the player data 322 associates player numbers 324 with controller identifiers 326.

A control 1410 may be presented which is configured to, when activated, add or remove controllers to the player data 322. For example, the user 102 may activate this control 1410 to add a new virtual controller user interface 124 executing on another source media device 104(2).

In some implementations, an additional user interface may be presented in response to activation of the control 1410. For example, a connection interface configured to accept user input for establishing a communication channel with the controller may be presented. The connection interface may be configured to allow the user 102 to establish Bluetooth pairing, enter Wi-Fi Direct connection information, and so forth.

A control 1412 may also be presented in the first user interface 1402. The control 1412 is configured to, when activated, present one or more controls configured to change the associations between the player numbers 324 and the controller identifiers 326 associated with the respective controllers. For example, an additional user interface may be presented which allows the user 102 to rearrange the controllers, such that controllers swap player numbers 324.

The second user interface 1404 may be invoked while the user 102 is using the application module 106, such as while the application module 106 is executing on the hardware processor 302. For example, while playing the game, the user 102 may press a "home" button on the controller which invokes the second user interface 1404. In some implementations, the second user interface 1404 may include application imagery 1414 obtained or derived from the application module 106 executing at the time the second user interface 1404 was invoked.

In this second user interface 1404, the controller information 1408 depicts an unassigned controller identifier 1416. The unassigned controller identifier 1416 is depicted as a blank tile or slot, with the player number 324 of "2" presented. The user 102 may assign this player number 324 to a controller having a controller identifier 326.

In some implementations, the controller information 1408 may also indicate when a controller is unusable by presenting an indicia of unusability. For example, the controller which has been configured with a virtual controller user interface 124 which is incompatible with the application module 106 may be designated as unusable. Should the controller become available again, the indicia of unusability may be removed, and input may be provided to the application module 106.

The second user interface 1404 may also present the control 1410 to add or remove controllers, the control 1412 to reorder controllers, and so forth as described above. This allows the user 102 flexibility during game play of changing the player data 322.

Additional controls in the second user interface 1404 may include a control 1420 configured to resume the game. Activation of the control 1420 may thus close the second user interface 1404, and resume execution of the application module 106. Another control 1422 may be configured to, when activated, close the second user interface 1404 and transition to a home user interface. The home user interface may be configured to provide access to various functions, menus, and so forth.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising a source device configured to accept user input and a target device responsive to the user input:
   the target device comprising:
   a first communication interface;
   a first memory storing computer-executable instructions; and
   a first hardware processor communicatively coupled to the first communication interface and the first memory, the first hardware processor configured to execute the computer-executable instructions to:

establish communication with the source device;
determine an application executing on the first hardware processor of the target device;
retrieve input configuration data for executing the application including input mapping data which associates control data received from the source device with first event data, wherein:
the control data comprises data indicative of particular user inputs made using input devices of the source device; and
the first event data comprises data indicative of particular commands associated with activation of a particular control on a physical controller;
send, to the source device, application data indicating the application executing on the target device and virtual controller data used by the source device to select a virtual controller user interface to present;
receive the control data, from the source device, wherein the control data is based on user inputs from one or more virtual controls of the virtual controller user interface presented on the source device based on the virtual controller data;
generate modified input mapping data associated with the virtual controller data used to select the virtual controller user interface, the modified input mapping data used by the target device to change association of the control data with second event data for providing to the application as input for executing the application;
use the modified input mapping data to generate the second event data from the control data instead of the first event data; and
store the second event data into an input file read by an operating system executing on the first hardware processor, wherein the operating system is configured to provide the second event data to the application executing on the first hardware processor.

2. The system of claim 1, wherein the source device comprises:
a second communication interface;
a second memory storing computer-executable instructions;
a touchscreen input device; and
a second hardware processor communicatively coupled to the second communication interface, the second memory, and the touchscreen input device, the second hardware processor configured to execute the computer-executable instructions to:
receive the application data;
receive the virtual controller data;
select the virtual controller user interface based at least in part on the application data and the virtual controller data;
present the virtual controller user interface on the touchscreen input device, the virtual controller user interface comprising the one or more virtual controls configured to simulate controls available on a physical controller;
accept the user inputs comprising data indicative of one or more touches to the touchscreen input device corresponding to the one or more virtual controls;
generate the control data based on the user inputs; and
send the control data to the target device using the second communication interface.

3. The system of claim 2, wherein:
the one or more virtual controls simulate one or more joystick controllers, and
the first event data is descriptive of input using the one or more joystick controllers.

4. The system of claim 1, further comprising a server, the server comprising:
a third communication interface;
a third memory storing computer-executable instructions; and
a third hardware processor communicatively coupled to the third communication interface and the third memory, the third hardware processor configured to execute the computer-executable instructions to:
access the application as provided for distribution to the target device;
determine one or more application inputs associated with the application, the determination comprising at least one or more of:
application of a plurality of pre-determined inputs to the application during execution,
generation of decompiled code of the application and analysis of the decompiled code,
inspection of a manifest file associated with the application, or
analysis of one or more user interface elements provided by the application during execution;
generate the input configuration data based on the one or more application inputs;
store the input configuration data;
determine the virtual controller data corresponding to the input configuration data; and
store information indicative of the corresponding virtual controller data.

5. A computer-implemented method executable on a source device, the method comprising:
receiving, at the source device, input configuration data for executing an application, the input configuration data including input mapping data which associates control data received with first event data;
receiving at the source device, application data determined by a target device and indicative of the application executing on the target device;
receiving at the source device, virtual controller data associated with the application, the virtual controller data associated with a virtual controller user interface presented by the source device, the virtual controller user interface including one or more virtual controls;
generating modified input mapping data for the virtual controller user interface associated with the virtual controller data, the modified input mapping data for changing association of the control data with second event data for providing to the application as input for executing the application;
receiving one or more user inputs by way of the virtual controller user interface;
generating the control data from the one or more user inputs based on the input configuration data and the virtual controller data;
using the modified input mapping data to generate the second event data from the control data instead of the first event data; and
sending the control data and the second event data to the application executing on the target device to use in response to the control data.

6. The computer-implemented method of claim 5, further comprising:

establishing communication with the target device and using one or more networks, wherein the one or more networks are compliant with at least a portion of one or more standards including Wi-Fi, Wi-Fi Direct, Bluetooth, or Bluetooth Low Energy.

7. The computer-implemented method of claim 5, further comprising:
generating log data indicative of usage of the virtual controller user interface, wherein the log data includes one or more of:
number of active target devices,
number of active source devices,
input latency data,
data communication statistics,
control session length data,
source device operating system version, or
target device operating system version; and
sending the log data to an external device.

8. The computer-implemented method of claim 5, wherein the one or more user inputs comprise coordinates corresponding to one or more touches on a touch sensor device; and
the generating the control data comprises receiving association data representing the one or more of the touches on the touch sensor device with a particular one of the virtual controls on the virtual controller user interface.

9. The computer-implemented method of claim 5, wherein the generating the control data from the source device based on user inputs provided at the virtual controller user interface further comprises association data representing one or more touches on images of one or more of the virtual controls presented on a touchscreen, further wherein the images are configured to simulate a physical control of a physical controller.

10. The computer-implemented method of claim 9, wherein the virtual controls are representative of one or more of:
directional pads,
action buttons, or
joysticks.

11. A computer-implemented method executable on a target device, the method comprising:
determining that an application is executing on the target device;
sending, to a source device, application data indicating the executing application and virtual controller data used by the source device to select a virtual controller user interface;
retrieving input mapping data which associates control data received from the source device with first event data;
receiving, from the source device, the control data that is based on user inputs from one or more virtual controls of the virtual controller user interface presented on the source device based on the virtual controller data;
generating modified input mapping data associated with the virtual controller data used to select the virtual controller user interface, the modified input mapping data for changing association of the control data with second event data for providing to the application as input for executing the application;
generating the second event data from the control data using the modified input mapping data; and
storing the second event data at a memory location read by an operating system, wherein the second event data stored in the memory location is processed by the target device as input to the executing application.

12. The computer-implemented method of claim 11, further comprising:
establishing communication using one or more networks, wherein the one or more networks are compliant with at least a portion of one or more standards including Wi-Fi, Wi-Fi Direct, Bluetooth, or Bluetooth Low Energy.

13. The computer-implemented method of claim 11, further comprising:
sending, to the source device, the virtual controller data configured to present the virtual controller user interface on the source device.

14. The computer-implemented method of claim 11, wherein:
the receiving the control data comprises receiving information indicative of particular user input associated with an input device of the source device; and
the generating the modified input mapping data further comprises generating the modified input mapping data that associates the change of at least one of the control data to the second event data such that a particular user input on the input device of the source device results in particular event data.

15. The computer-implemented method of claim 11, wherein the storing the second event data at the memory location further comprises storing the second event data at the memory location read by a user level input subsystem of the operating system of the target device.

16. The computer-implemented method of claim 11, the method further comprising:
establishing communication between the device and the source device using one or more networks.

17. The computer-implemented method of claim 11, the determining the executing application comprising polling the operating system to obtain the application data indicative of the executing application.

18. The computer-implemented method of claim 11, the determining the executing application comprising establishing a controller wrapper configured to initiate execution of the application and generate information indicative of the initiation.

19. The computer-implemented method of claim 11, the method further comprising:
determining the application is no longer executing; and
sending, to the source device, the application data comprising information indicative that the application is no longer executing.

20. The computer-implemented method of claim 11, further comprising:
generating log data indicative of operation of the device; and
sending, to an external device, the log data.

* * * * *